United States Patent [19]

Takara

[11] Patent Number: 5,590,568

[45] Date of Patent: Jan. 7, 1997

[54] LAYERED BODY HAVING ROTATING ADJACENT LAYERS WITH MAGNETIC POLES ON FACING SURFACES

[76] Inventor: Muneaki Takara, 19-20, Oroku 1-chome, Naha-shi, Okinawa, Japan

[21] Appl. No.: 211,385

[22] PCT Filed: Oct. 7, 1992

[86] PCT No.: PCT/JP92/01300

§ 371 Date: Oct. 31, 1994

§ 102(e) Date: Oct. 31, 1994

[87] PCT Pub. No.: WO93/07387

PCT Pub. Date: Apr. 15, 1993

[30] Foreign Application Priority Data

| Oct. 7, 1991 | [JP] | Japan | 3-289275 |
| Jun. 4, 1992 | [JP] | Japan | 4-170258 |
| Jun. 5, 1992 | [JP] | Japan | 4-171887 |

[51] Int. Cl.[6] .............. F03G 3/08; F16C 32/04
[52] U.S. Cl. .............. 74/572; 74/DIG. 4
[58] Field of Search .............. 74/572, DIG. 4, 74/574

[56] References Cited

FOREIGN PATENT DOCUMENTS

| 0151196 | 8/1985 | European Pat. Off. | 74/572 |
| 3719618 | 12/1988 | Germany | 74/572 |
| 510752 | 7/1955 | Italy | 74/572 |
| 0112448 | 8/1980 | Japan | 74/572 |
| 0041441 | 2/1987 | Japan | 74/574 |
| 404282050 | 10/1992 | Japan | 74/572 |

*Primary Examiner*—Charles A. Marmor
*Assistant Examiner*—MaryAnn Battista
*Attorney, Agent, or Firm*—Fish & Richardson P.C.

[57] ABSTRACT

A device for rotating a layered body includes multiple rotating plates arranged in equally spaced layers and coaxially aligned about an axis of rotation. Facing plate surfaces between each pair of neighboring plates form a gap between neighboring plates. At least one magnetic pole is provided on each plate surface that forms a gap. The magnetic poles being arranged such that the polarities of magnetic poles on facing surfaces in each gap are the same. When the rotating plates are stationary, the at least one magnetic pole on one plate is arranged to occupy an alternating position with a corresponding magnetic pole on the facing surface of the neighboring plate.

13 Claims, 28 Drawing Sheets

Fig. 17
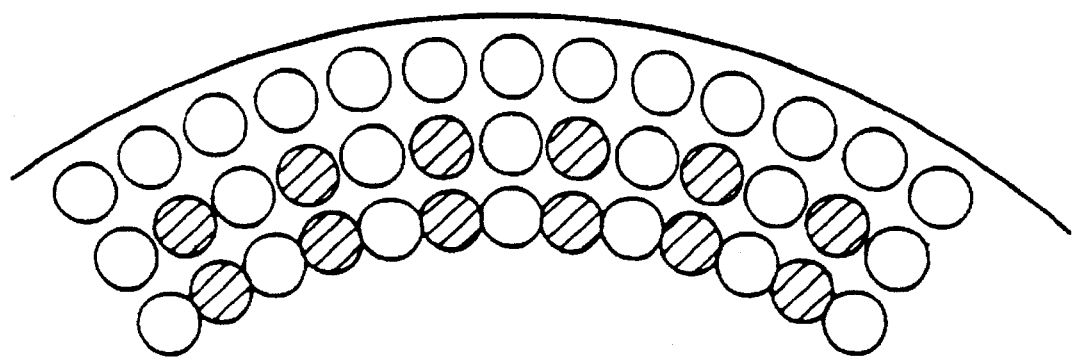
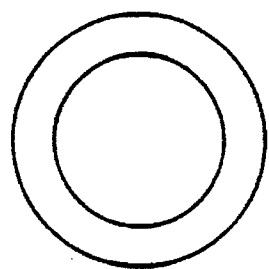

5,590,568

LAYERED BODY HAVING ROTATING ADJACENT LAYERS WITH MAGNETIC POLES ON FACING SURFACES

TECHNICAL FIELD

The present invention relates to a device and a method for rotation, so adapted as to efficiently rotate a layered rotating body in a layer structure consisting of a plurality of rotating plates arranged in layers.

For example, when the rotating plates are employed as flywheel disks, such a rotating device can be employed for a flywheel energy storage system for storing rotating energy produced by rotating the flywheel disks at a high speed.

BACKGROUND ART

A flywheel energy storage system is so adapted as to store rotational energy produced by rotating a flywheel disk at a high speed, and the rotation of the flywheel disk is urged with an electric motor. For such a flywheel energy storage system, the rotational energy to be stored can be made greater as the flywheel disk becomes heavier and as it is rotated at a higher speed.

In order to allow the flywheel disk having a heavy weight to rotate at a high speed from its stationary state within a short time, a large-size and large-rated electric motor having a great magnitude of a driving torque is required. Such an electric motor, however, is expensive and a place where it is to be installed should be large, whereby the total system also becomes too large in size.

On the other hand, when the attempt is made to rotate a flywheel disk having a heavy weight at a high speed by an electric motor small in size and to drive the rotation of such a heavy flywheel disk directly by means of an output of the such small-size electric motor, there is the risk that the electric motor becomes in an overload state and it is burned out. Hence, the flywheel disk is required to be rotated gradually by means of a certain transmission mechanism in order to cause no or little overload to be imposed upon the electric motor. This system, however, requires a long time for rotating the flywheel disk at a high speed. Further, such a transmission mechanism produces energy such as heat, resulting in a loss of energy.

The present invention has been performed with the above situation taken into account and the object of the present invention is to provide a device for rotation and a method therefor, capable of efficiently converting sequentially input rotative driving power into the rotational energy of the whole of the layered rotating body of a layer structure. This arrangement allows even a small-sized electric motor to rotate the heavy flywheel disk at a high speed within a short time.

DISCLOSURE OF INVENTION

In order to achieve the object as described hereinabove, one aspect of this invention is to provide a rotating device for rotating a layered rotating body in a layer structure comprising a plurality of rotating plates arranged in layers in a spaced relationship equally apart from each other and with their rotating axes aligned coaxially, which is characterized in that, on each of said layered rotating plates of the layered rotating body, a group of each of magnetic poles (31 to 37) is provided on the surface of the respective rotating plate facing the neighboring layer; said group of each of the magnetic poles is made equal in polarity to another group of each of the magnetic poles provided on the surface of the respective rotating plate of the neighboring layer; and each magnetic pole of the group of the magnetic poles provided on the surface of the respective rotating plate of the neighboring layer is arranged alternately with each magnetic pole of the group of the magnetic poles provided on the surface of the respective rotating plate facing the neighboring layer, when the rotating plates are in a stationary state.

For the rotating device, the group of each of its rotating plates comprises a plurality of magnetic poles arranged on each rotating plate at equal angles about the axis of rotation of its rotating plates and in an equally spaced relationship apart from its neighboring magnetic poles.

The rotating device in this aspect of the invention is arranged in such a manner that the rotative driving power input into the rotating plate of an input layer is transmitted to another rotating plate of a neighboring layer and sequentially to the adjacent rotating plates by magnetic repulsion produced between the adjacent layers with respect to the displacement in the rotational direction of the rotating plate and as a consequence that the rotating plate of each layer of the layered rotating body are rotated concurrently with each other. In this case, the rotative driving power to be applied directly from a driving source is the one that is strong enough to drive the rotation of the rotating plate of the input layer only; hence, even a motor having a low output can drive the rotation of the rotating plate thereof.

In another aspect, this invention is to provide a rotating device for rotating a layered rotating body in a layer structure comprising a plurality of rotating plates (101 to 111) arranged in layers in a spaced relationship equally apart from each other and with their rotating axes aligned coaxially, which is characterized in that, on each of said layered rotating plates of the layered rotating body, first and second groups of each of magnetic poles are provided on the surface of the respective rotating plate facing the neighboring layer; said first and second groups of each of the magnetic poles are made equal in polarity to another first and second groups of each of the magnetic poles, respectively, provided on the surface of the rotating plate of the neighboring layer; each magnetic pole of the first group of the magnetic poles provided on the surface of the respective rotating plate of the neighboring layer is arranged alternately with each magnetic pole of the first group of the magnetic poles provided on the surface of the respective rotating plate facing the neighboring layer; and each magnetic pole of said second group of the magnetic poles provided on the surface of the respective rotating plate of the neighboring layer is arranged overlapping with each magnetic pole of said second group of the magnetic poles provided on the surface of the respective rotating plate facing the neighboring layer.

For the rotating device in this aspect of the invention, the first group of the magnetic poles provided on each of its rotating plates comprises a plurality of magnetic poles arranged on each rotating plate at first equal angles about the center of the rotation axis of each of the rotating plates and in an equally spaced relationship from its neighboring magnetic poles and the second group of the magnetic poles provided on each of its rotating plates comprises a plurality of magnetic poles arranged on each rotating plate at second equal angles about the axis of rotation, yet a half of the first equal angles at which the first group of the magnetic poles are arranged on each of the rotating plates, and in an equally spaced relationship from its neighboring magnetic poles.

Further, for the rotating device, the second group of the magnetic poles is arranged so as to allow a ready rotation of the rotating plates by compensating for the influence of the opposite magnetic pole appearing in the position between the neighboring magnetic poles of the first magnetic poles group and to convert even the minute force of rotation into the force of urging the rotation of the rotating plates. Hence, the addition of the second magnetic poles group can efficiently convert the input energy into the rotational energy of the rotating plate of each layer.

For each embodiment of the rotating devices as described hereinabove, a reverse inhibition means for inhibiting a reverse rotation of the rotating plate may be mounted to the rotating plate of the input layer of the layered rotating body, into which the rotative driving power is entered, to the rotating plate of the layer on the end side relative to the input layer, to the rotating plate of an output layer from which the rotational output is taken, to a combination of those rotating plates, or to each of all the rotating plates of the whole layers of the layered rotating body.

The arrangement of the reverse inhibition means on the rotating plate of the input layer can efficiently utilize the entered rotative driving power as the force of urging the rotation of the rotating plate of each layer in the normal direction without the loss as the force of rotating the rotating plates in the reverse direction.

Further, the arrangement of the reverse inhibition means on the rotating plate of the layer on the end side relative to the input layer can efficiently urge the rotation of the rotating plates, particularly at the time of the start of the rotation, because the force of the rotation of the rotating plates in the normal direction, which is transmitted sequentially through each layer from the input layer, is reversed or turned at the layer on which the reverse inhibiting means is mounted, further working as the force of urging the rotation of the rotating plate of each layer.

In addition, when the reverse inhibiting means is disposed on the rotating plate of the output layer from which the rotational output is taken or extracted, the rotating plates can be prevented from rotating in a reverse direction due to the influence of negative load.

Furthermore, the arrangement of the reverse inhibiting means on each rotating plate of the entire layers can present the effects better than the effects achieved by the arrangements in the embodiments as described hereinabove.

For each embodiment of the rotating devices as described hereinabove, the rotating plate of the input layer into which the rotative driving power is entered may further be provided with an intermittently driving means for applying the rotative driving power intermittently to the rotating plate of the input layer.

By applying the rotative driving power intermittently to the rotating plate of the input layer by the intermittently driving means, the rotating plate of each layer of the layered rotating body can be rotated more efficiently. The greater effects can be achieved particularly in combination with the reverse inhibiting means.

In each embodiment of the rotating devices as described hereinabove, the layered rotating body is arranged in such a fashion that it is of a cone-shaped structure as a whole, in which the disk-shaped rotating plates are arranged vertically and coaxially so as to become sequentially larger in diameter and heavier in weight in order of layer from the rotating plate of the input layer into which the rotative driving power is entered and that the groups of the magnetic poles on each layer of the layered rotating body are arranged so as to become sequentially larger in magnetic force in order of layer from the input layer toward the layers at the end portion side of the layered rotating body.

This arrangement of the rotating plates can smoothly rotate a heavy rotating plate disposed at the end portion side of the layered rotating body.

Further, each embodiment of the rotating devices as described hereinabove may be structured such that the groups of the magnetic poles of each layer of the layered rotating body are so arranged as for an axial component, extending axially toward the center of rotation, of the magnetic repulsion working between the groups of the magnetic poles on the rotating plate of the neighboring layer to become larger and, as a consequence, for each rotating plate of an intermediate layer of the layered rotating body to be brought into an afloat or suspended state by the axial component of the magnetic repulsion from the groups of the magnetic poles of both rotating plates of the neighboring layers.

By bringing each rotating plate of the intermediate layer into a substantially afloat or suspended state, the rotating plates of those layers can be rotated smoothly with little or no substantial friction of the respective rotating plates.

In a further aspect, the present invention is to provide a rotating device for rotating a layered rotating body in a layer structure comprising a plurality of rotating plates arranged in layers in a spaced relationship equally apart from each other and with their rotating axes aligned coaxially, which is characterized in that, on each of said layered rotating plates of the layered rotating body, a group or groups of each of magnetic poles is or are provided on the surface of the respective rotating plate facing the neighboring layer; said group or groups of each of the magnetic poles is or are made opposite in polarity to another group or groups of each of the magnetic poles provided on the surface of the respective rotating plate of the neighboring layer; and each magnetic pole of the group or groups of the magnetic poles provided on the surface of the respective rotating plate of the neighboring layer is arranged overlapping with each magnetic pole of the group or groups of the magnetic poles provided on the surface of the respective rotating plate facing the neighboring layer.

In the above aspect of this invention, the arrangement of the layered rotating body can transmit the rotative driving power entered into the rotating plate of the input layer sequentially to the rotating plate of the neighboring layer by rotating the rotating plate of the neighboring layer due to the force of magnetic attraction because the force of magnetic attraction is produced in the circumferential direction of rotation between the rotating plates of the neighboring layers when the rotating plates are rotated.

In an additional aspect, the present invention is to provide a rotating device for rotating a layered rotating body in a layer structure comprising a plurality of rotating plates arranged in layers in a spaced relationship equally apart from each other and with their rotating axes aligned coaxially, which is characterized in that, on each of the rotating plates of said layered rotating body, a spring means is mounted between the rotating plates of the neighboring layers of said layered rotating body; and said spring means is so arranged as to produce a spring force in the direction resisting the displacement of the relative position between the rotating plates of the neighboring layers caused by the rotational movement of the rotating plate of the neighboring layer.

By rotating the rotating plates of the neighboring layers with the aid of the spring force generated by the spring means, the rotative driving power applied to the rotating plate of the input layer can be transmitted sequentially to the rotating plates of the neighboring layers.

In a still further aspect, the present invention is to provide a method for the rotation of a layered rotating body in a layer structure comprising a plurality of rotating plates arranged in layers in a spaced relationship equally apart from each other and with their rotating axes aligned coaxially and having a force generating means mounted on the surface of the rotating plate of each layer facing the neighboring layer, said force generating means being so adapted as to generate the force in the direction in which the spring force resists the displacement of the relative position between the rotating plates of the neighboring layers caused by the rotational movement of the rotating plate, which is characterized in that the rotative driving power entered into the rotating plate of an input layer of said layered rotating body is transmitted by the force generated by said force generating means sequentially to each of the rotating plates of the neighboring layers, thereby rotating said layered rotating body.

The force generating means may be comprised of the groups of magnetic poles which are disposed on the surface of the respective rotating plate of each layer on the side of the neighboring layer so as to make the polarity on the surfaces of the rotating plates of the neighboring layers equal to each other as well as to generate the force in the direction in which to resist the rotational movement of the rotating plate causing no relative displacement in the positions of the adjacent rotating plates of the neighboring layers.

Further, the force generating means may be comprised of the spring means disposed between the rotating plates of the neighboring layers and arranged so as to have its spring force work in a manner in which to resist the rotational movement of the rotating plate causing no relative displacement in the positions of the adjacent rotating plates of the neighboring layers.

The method for rotation according to the present invention may be arranged such that the rotative driving power is applied intermittently to the input layer of the rotating plate of the layered rotating body.

BRIEF DESCRIPTION OF THE DRAWINGS

FIG. 17 is a schematic representation showing the arrangement of the positions of the permanent magnets for the flywheel disk according to the still further embodiment of this invention for describing the action of the permanent magnets when the flywheel disk is in a stationary state.

BEST MODES FOR CARRYING OUT THE INVENTION

The present invention will be described in more detail by way of examples with reference to the accompanying drawings.

Figure 1:
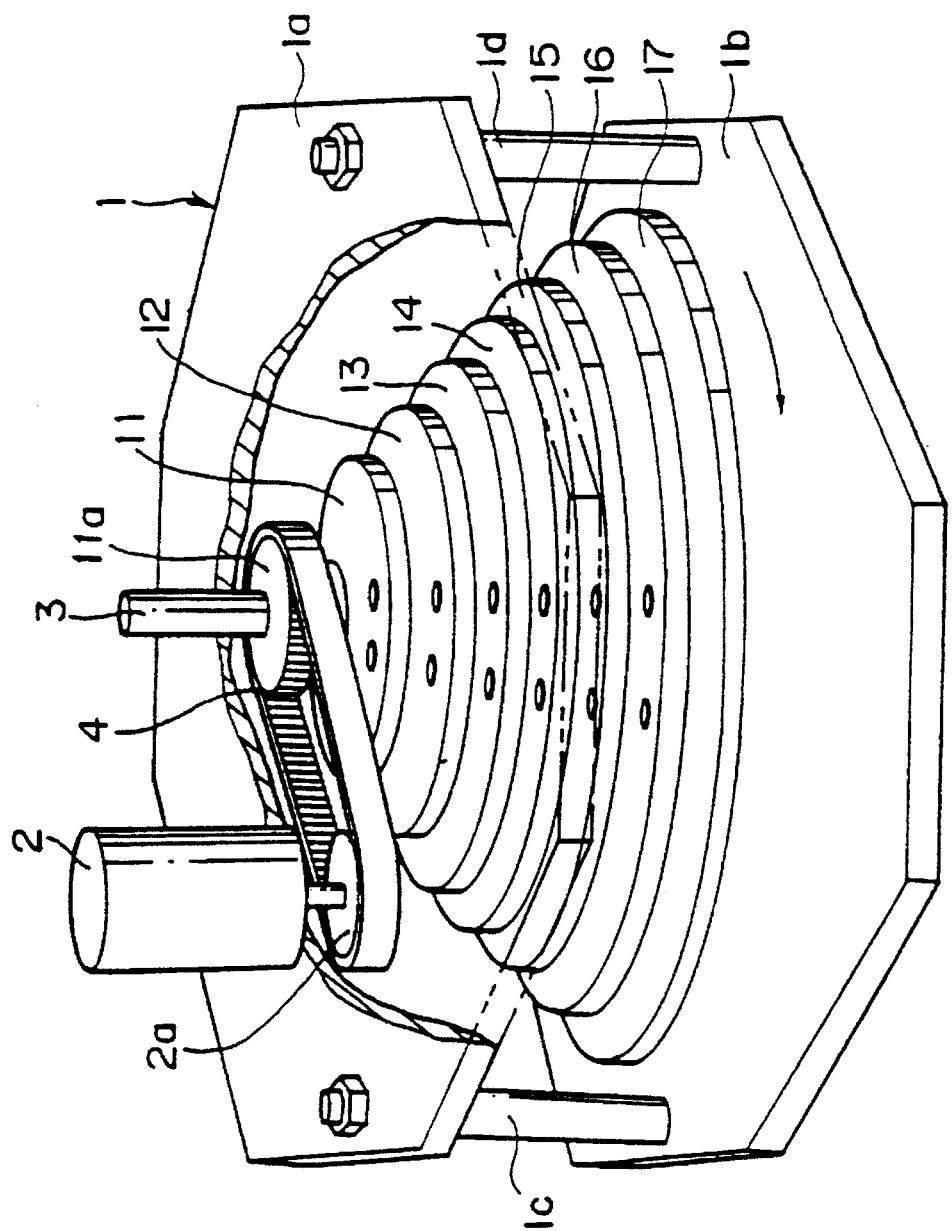
FIG. 1 is a partially cut-away, perspective view showing a rotating device according to an embodiment of the present invention.
Figure 2:
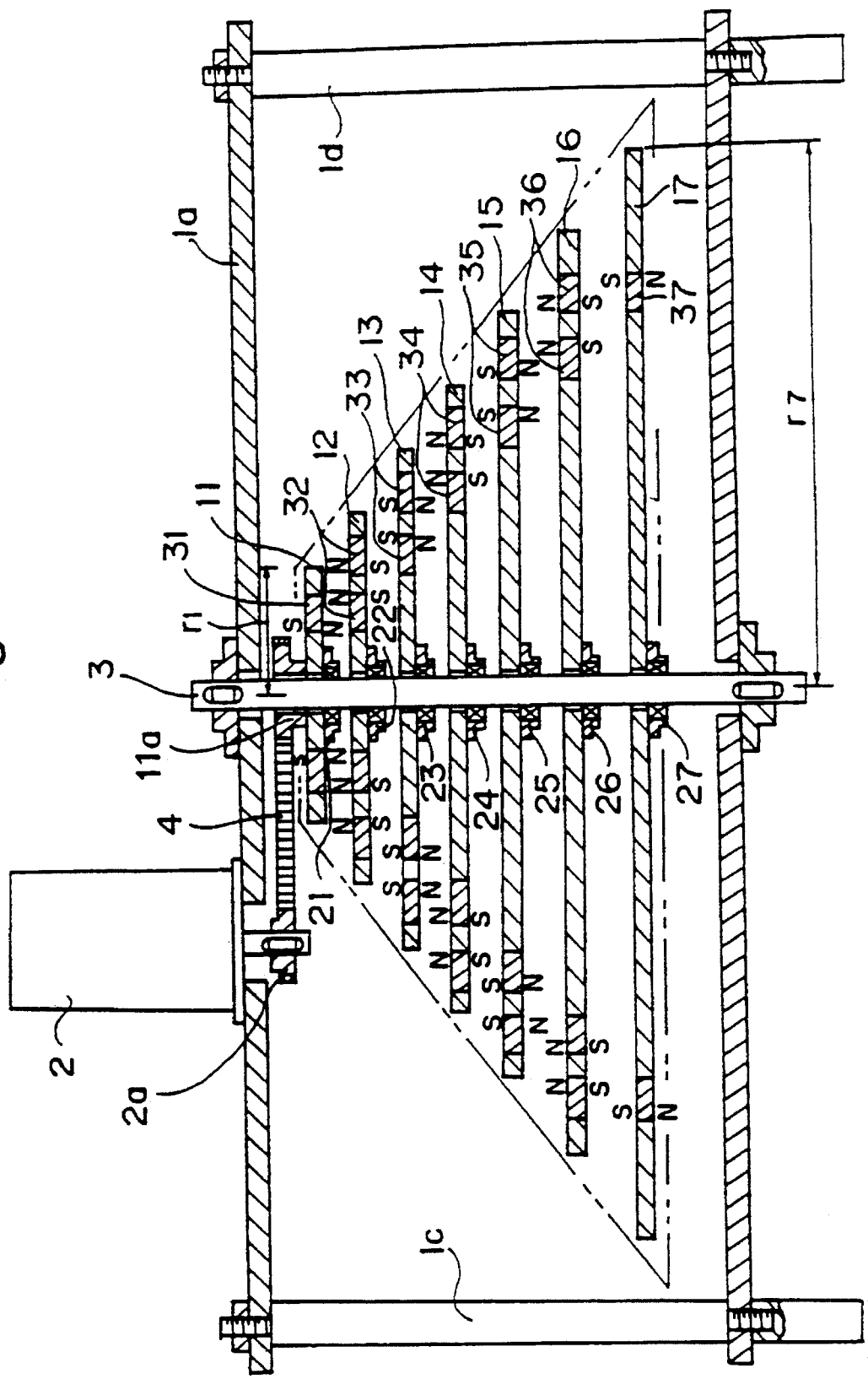
FIG. 2 is a side view in section showing the rotating device according to the embodiment of this invention.
Figure 3:
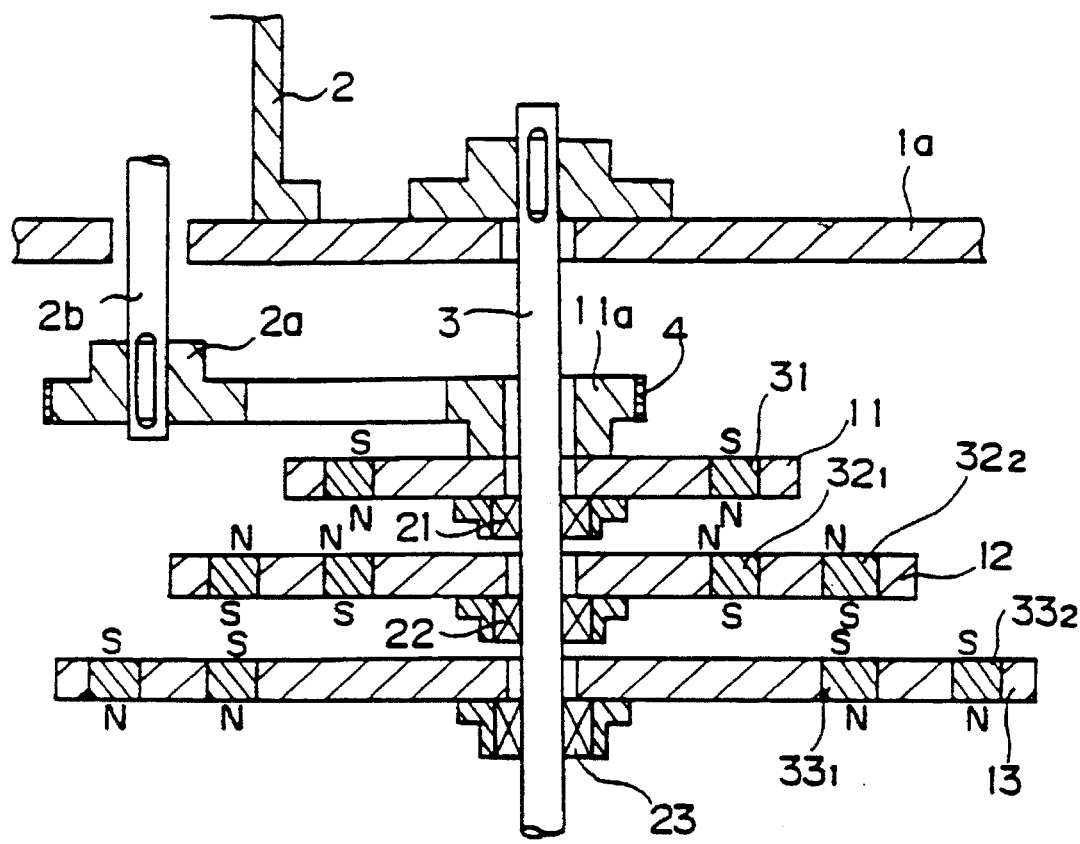
FIG. 3 is a side view in section showing the details of a driving force input mechanism portion of the rotating device according to the embodiment of this invention.

FIG. 1 is a partially cut-away, perspective view showing the rotating device according to an embodiment of the present invention, FIG. 2 is a side view in section showing the rotating device according to the embodiment thereof, and FIG. 3 is a side view in section showing the details of a driving force input mechanism portion of the rotating device according to the embodiment thereof. This embodiment is directed to an example in which the rotating device according to the present invention is applied to a flywheel rotating device for rotating a layered rotating body with flywheel disks superimposed in plural layers.

As shown in the drawings, a support frame 1 is arranged to have an upper base 1a and a lower base 1b supported and fixed parallel to each other by support columns 1c and 1d, and each of the upper and lower bases 1a and 1b of the support frame 1 is provided at its center with a through hole in and through both of which a middle axle 3 is inserted vertically and attached as well as which works as the center of rotation of the flywheel disks. To the middle axle 3 are mounted seven flywheel disks 11 to 17, inclusive, with their centers of rotation arranged coaxially, which are arranged in layers and at distances equally apart vertically from the neighboring flywheel disk or disks. Each of the flywheel disks 11 to 17 is attached to the middle axle 3 through each of rachet bearings 21 to 27, respectively, thereby allowing the rotation only in the normal direction. In this description, the normal direction is intended to mean the clockwise direction when looked at the flywheel rotating device downward from top.

Figure 4:
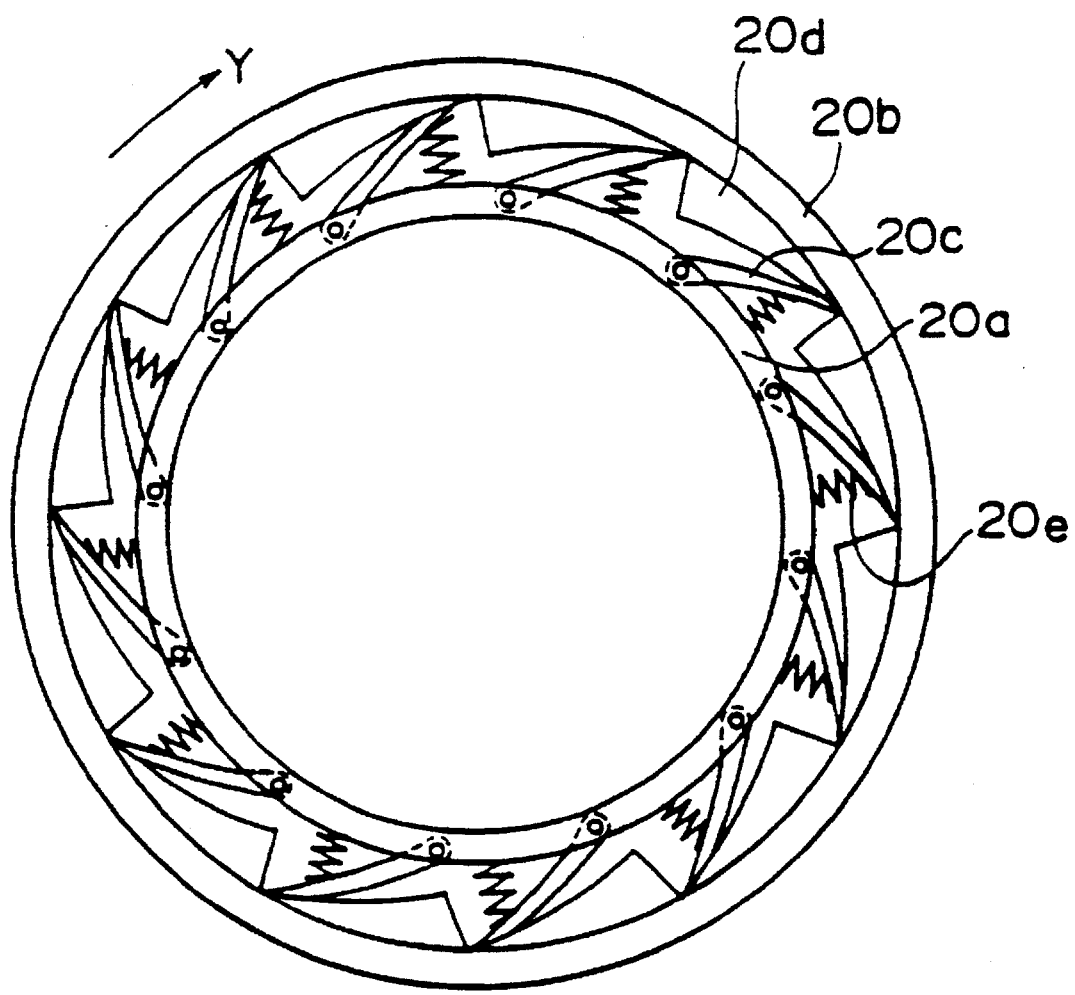
FIG. 4 is a view showing an example of the arrangement of rachet bearings.

FIG. 4 shows an example of the arrangement of one of the rachet bearings 21 to 27. The structure of the rachet bearing has the mechanism that allows the rotation of the flywheel disks in one (normal) direction only and that inhibits the rotation thereof in the opposite (reverse) direction. As shown in FIG. 4, the rachet bearing may comprise an inner race 20a to be attached to the middle axle 3, an outer race 20b to be attached to an inner side of the flywheel disk, pawls 20c disposed rotatably on the inner race 20a, teeth 20d disposed at the inner side of the outer race 20b, and springs 20e disposed between the tips of the respective pawls 20c of the inner race 20a and the inner race 20a for working so as to push outwardly the pawls 20c. In the drawing, the arrow as indicated by "Y" is intended to mean the normal direction of rotation of the outer race 20b (i.e. the normal direction of the flywheel disk). The arrangement of the rachet bearings 21 to 27 can suppress the flywheel disks 11 to 17, inclusive, from rotating in the reverse direction in their plural positions. If the rachet bearing is provided with a number of pawls 20c, the rotation can be suppressed in almost all positions.

The flywheel disks 11 to 17, inclusive, are arranged such that a flywheel disk having a smaller radius is superimposed on a flywheel disk having a larger radius and that the radius r1 of each flywheel disk is set to become larger constantly by r0. In other words, given the radius of the flywheel disk 11 of the uppermost layer being indicated by r1, the radius $r_i$ of each flywheel disk 11 to 17 can be represented by the formula:

$$r_i = r1 + (i-1)r0$$

where i = integer of 1 to 7.

The flywheel disks 11 to 17, inclusive, are mounted to the middle axle 3 in a spaced relationship equally apart from each other and arranged in such a fashion that the outer radius of the second uppermost flywheel disk becomes larger by radius r2 relative to the uppermost flywheel disk and the outer radius of each of the other flywheel disk becomes sequentially larger by r3 to r7 relative to the respective flywheel disk superimposed thereon. In other words, the flywheel disks are arranged in a cone-shaped form as a whole. Further, each of the flywheel disks 11 to 17 may be made of iron or an alloy of iron and lead and they may become sequentially heavier from top to bottom. The flywheel disks 11 to 17 may weigh, for example, 10 kg, 20 kg, 40 kg, 80 kg, 160 kg, 320 kg and 640 kg, respectively.

A pulley 11a is mounted on an upper surface of the flywheel disk 11 of the uppermost layer with its rotational axis aligned with each other, thereby allowing the pulley 11a to rotate integrally with the flywheel disk 11. To the base 1a of the support frame 1 is mounted and secured a stepping motor capable of generating the rotative driving power intermittently, and its output shaft 2b is arranged inserting through the hole of the base 1a and projecting into the support frame 1. Further, the pulley 2a is secured to the output shaft 2b. A belt 4 is attached round the pulley 2a of the stepping motor 2 and the pulley 11a of the flywheel disk 11, thereby allowing the rotative driving power of the stepping motor 2 to be transmitted to the flywheel disk 11.

Figure 5:
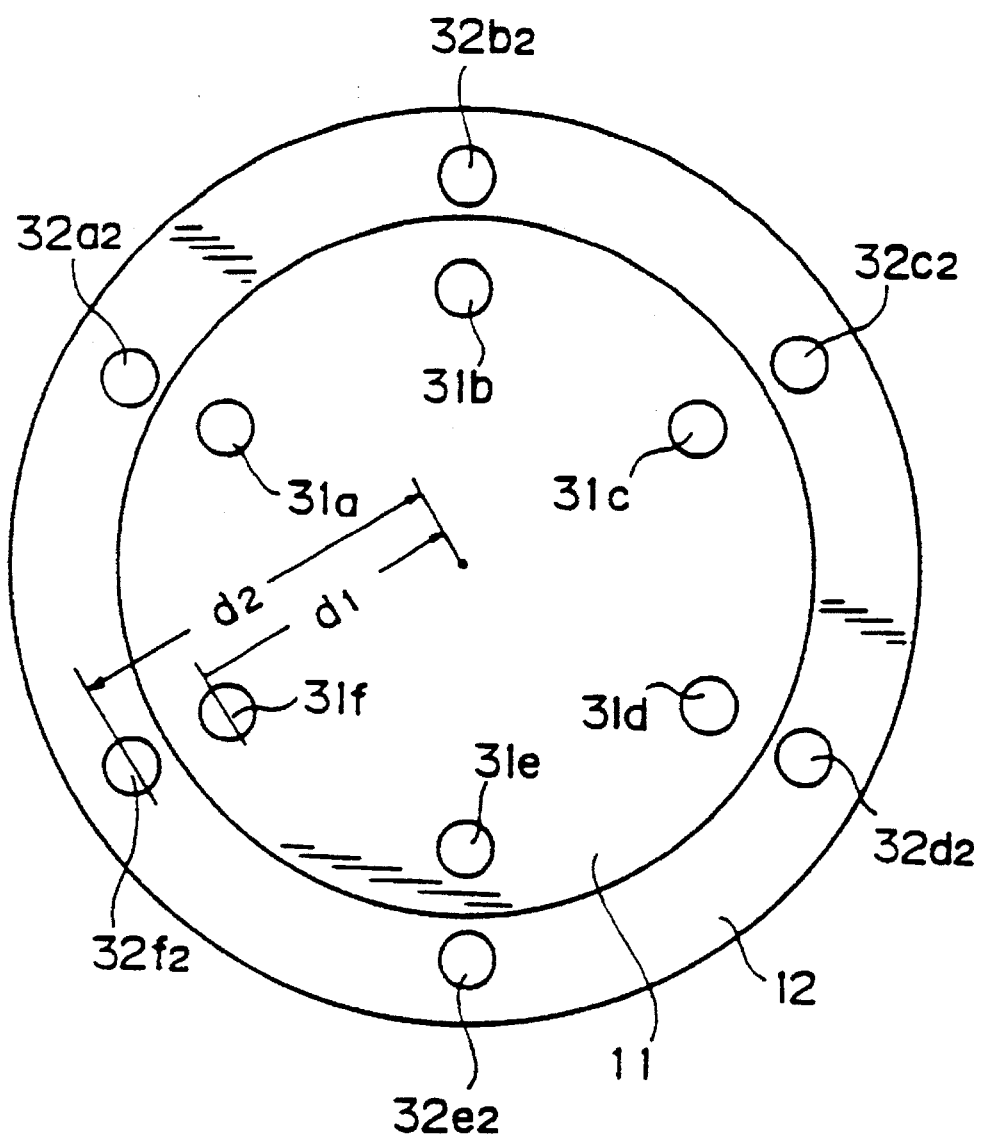
FIG. 5 is a schematic representation showing an arrangement of the positions of permanent magnets for a flywheel disk in the rotating device according to the embodiment of this invention.

The permanent magnets 31 to 37, inclusive, are disposed through and embedded in the flywheel disks 11 to 17, respectively, in such a manner that the magnetic poles of each permanent magnet are exposed from the respective surfaces of the corresponding flywheel disk. Each of the permanent magnets 31 to 37 is arranged on the respective flywheel disk 11 to 17 at an equal angle and in an equally spaced relationship along and on the circumstance of a circle about the middle axle 3 on each flywheel disk. For example, FIG. 5 shows an example of the arrangement of the permanent magnets, as indicated generically by reference numerals 31 and 32, respectively, on and in the flywheel disks 11 and 12. As shown in the drawing, the total number of six permanent magnets 31a to 31f are arranged on the flywheel disk 11 equally apart from each other at the angle of 60° on the circumference of a circle having the radius r1. Likewise, the total number of twelve permanent magnets consisting of six permanent magnets 32a1 to 32f1 and six permanent magnets 32a2 to 32f2 are arranged on the flywheel disk 12, each of the permanent magnets being arranged in a spaced relationship equally apart from each other at the angle of 60° on the circumferences of two circles having the radii r1 and r2, respectively. It is to be provided that, although FIG. 5 fails to show permanent magnets 32a1 to 32f1, they are located right under and face the respective permanent magnets 31a to 31f disposed on the rear surface of the rotating plate 11.

Likewise, each of the flywheel disk 12 to 16 of intermediate layers is provided with two circles in which the permanent magnets are disposed, an inner circle thereof being disposed so as to overlap with an outer circle disposed on the neighboring flywheel disk superimposed thereon and an outer circle thereof being disposed so as to overlap with an inner circle disposed on the neighboring flywheel disk placed thereunder. The total number of six permanent magnets 37a to 37f are arranged on the flywheel disk 17 of the lowest layer in a spaced relationship equally apart from each other at the angle of 60° on the circumference having the radius r6.

Each of the permanent magnets 31 to 37 embedded in the respective flywheel disks 11 to 17 is arranged so as for its exposed magnetic pole to be made equal in polarity to the exposed magnetic pole of the permanent magnet embedded in the neighboring or latter flywheel disk facing the former flywheel disk. In other words, for example, the permanent magnets 31 and 32 are arranged between the flywheel disks 11 and 12 in such a manner that the North magnetic poles of the permanent magnets 31 face the North magnetic poles of the permanent magnets 32 and the permanent magnets 32 and 33 are arranged between the flywheel disks 12 and 13 in such a manner that the South magnetic poles of the permanent magnets 32 face the South magnetic poles of the permanent magnets 33. Likewise, for example, the permanent magnets 36 and 37 are arranged between the flywheel disks 16 and 17 in such a manner that the South magnetic poles of the permanent magnets 36 face the South magnetic poles of the permanent magnets 37.

It is to be noted herein that, although each of the permanent magnets 31 to 37 of the respective flywheel disks 11 to 17 forms its own magnetic field, this magnetic field is less subject to the influence from the fact that each of the flywheel disks 11 to 17 is made of iron. Hence, the shape of the magnetic field is considered to be almost the same as the magnetic field formed when only each of the respective permanent magnets 31 to 37 are present.

Figure 7:
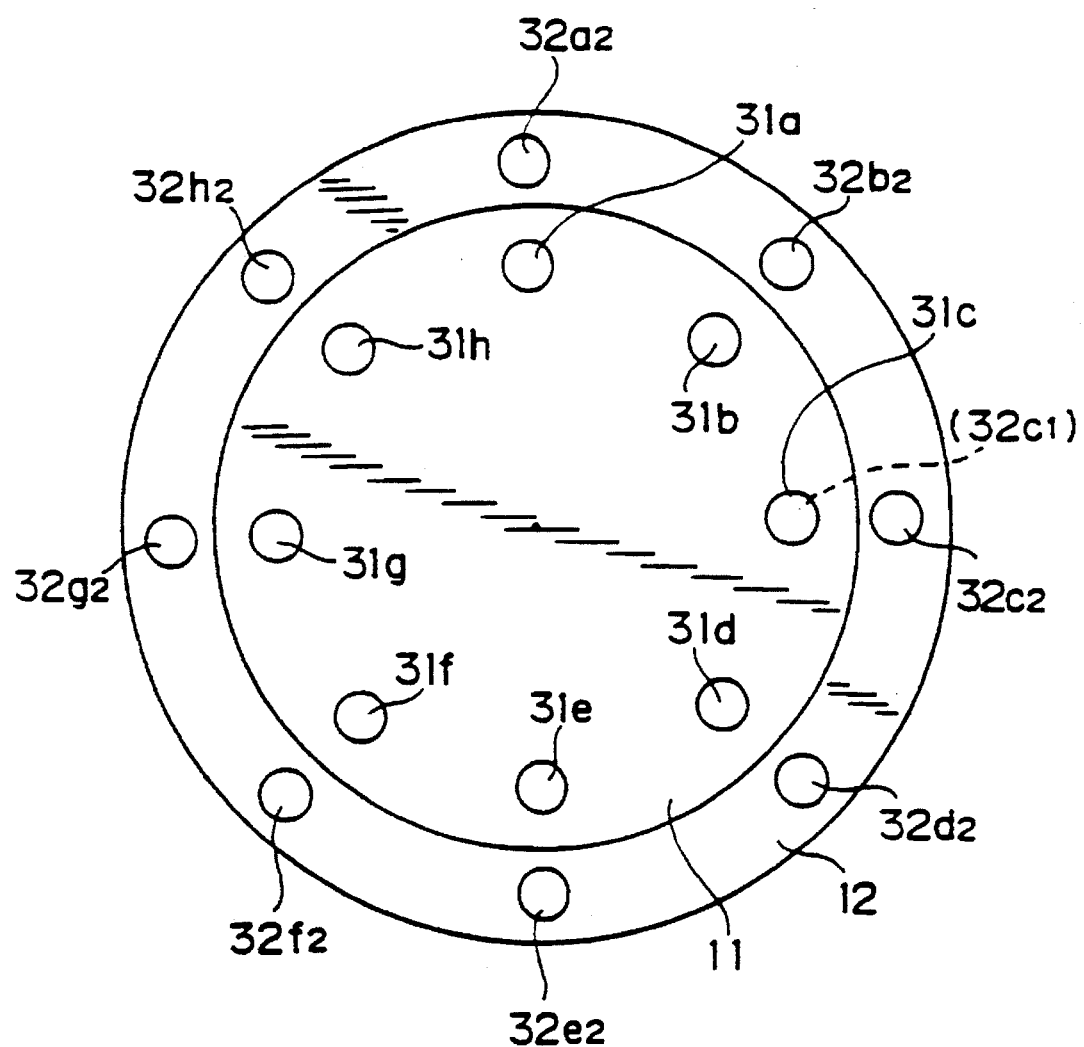
FIG. 7 is a schematic representation showing another arrangement of the positions of permanent magnets for a flywheel disk in the rotating device according to the embodiment of this invention.
Figure 8:
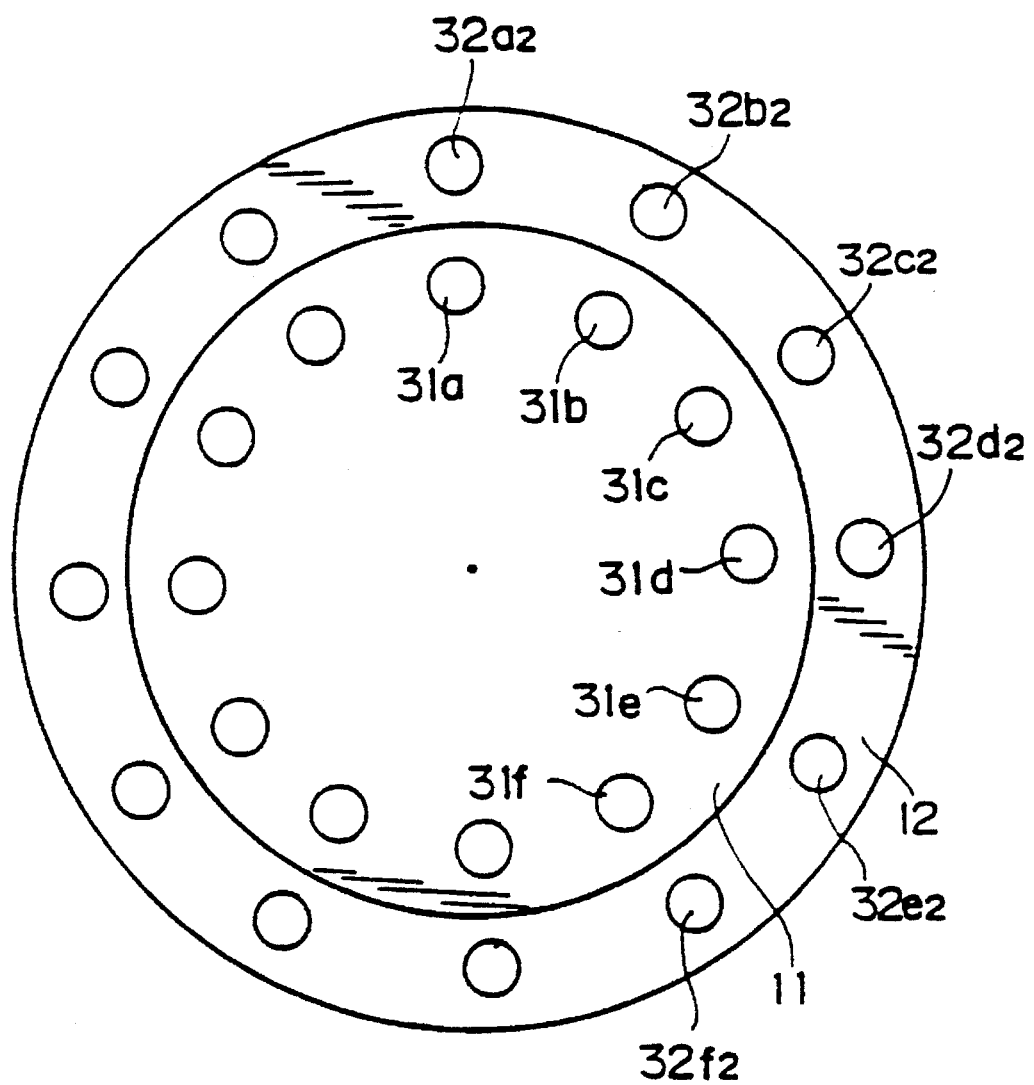
FIG. 8 is a schematic representation showing a further arrangement of the positions of permanent magnets for a flywheel disk in the rotating device according to the embodiment of this invention.

It is further to be noted herein that the angle at which the permanent magnets are disposed is not restricted to the angle of the permanent magnets in the manner as described hereinabove. For example, as shown in FIG. 7, the total number of eight permanent magnets are arranged on one circle in a spaced relationship equally apart at the angle of 45°, or, as shown in FIG. 8, the total number of twelve permanent magnets are arranged on one circle equally apart at the angle of 30°. It can furthermore be noted herein that, as in the embodiment as shown in FIG. 5, when the angles between the neighboring permanent magnets of each of the respective permanent magnets 31 to 37 are relatively large (i.e. when the number of the permanent magnets is relatively small), the diameter of each permanent magnet may be made greater than when the angles between the neighboring permanent magnets are smaller.

A description will now be made of the actions of the rotating device according to the embodiment of this invention.

First, the action of the permanent magnets 31 to 37, inclusive, mounted to the respective flywheel disks 11 to 17 will be described with reference to FIG. 6. FIG. 6 shows the mode of the action of the permanent magnets 31 and 32 mounted to the respective flywheel disks 11 and 12. These permanent magnets 31 and 32 are arranged in such a fashion that both of their magnetic poles exposed on the surfaces of the neighboring flywheel disks facing each other are North magnetic poles so that the permanent magnets 31 and 32 act against each other due to their same North magnetic poles and, as a consequence, the flywheel disks 11 and 12 repel each other on account of their same polarity. The same can be said of the action of the rest of the flywheel disks.

Figure 6A:
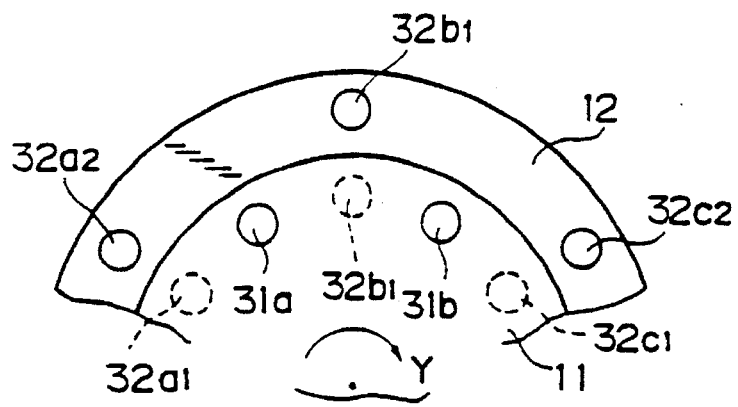
FIG. 6 is a series of schematic representations for describing the action of the permanent magnets for a flywheel disk in the rotating device according to the embodiment of this invention.

FIG. 6(a) shows a stationary state of the adjacent flywheel disks, i.e. the state in which the magnetic poles are in a balanced arrangement. In other words, the permanent magnets 31a to 31f, inclusive, are disposed in the circumference of the circle on the flywheel disk 11 so as to be arranged alternately with the permanent magnets 32a1 to 32f1, respectively, disposed in the inner circumference of the circle on the flywheel disk 12 placed right under the flywheel disk 11 and so as to be located at the circumferential middle of each of the neighboring permanent magnets 32a1 to 32f1. This stationary state occurs between the adjacent flywheel disks because, for example, when taking account of the permanent magnet 31a, the permanent magnet 31a is caused to repel from the neighboring permanent magnet 32a1 of the flywheel disk 12 in the normal direction (in the clockwise direction as indicated by reference symbol "Y" in FIG. 6(a)) on the basis of a certain magnitude of the magnetic repulsion and likewise from the neighboring permanent magnet 32b1 in the reverse direction (in the counterclockwise direction) on the basis of the same magnitude of the magnetic repulsion as that of the permanent magnet 32a1 and, as a consequence, the permanent magnet 31a is allowed to be located in a stationary state in the middle between the permanent magnets 32a1 and 32b1 where the magnetic repulsion produced by the permanent magnets 32a1 and 32b1 is balanced.

Figure 6B:
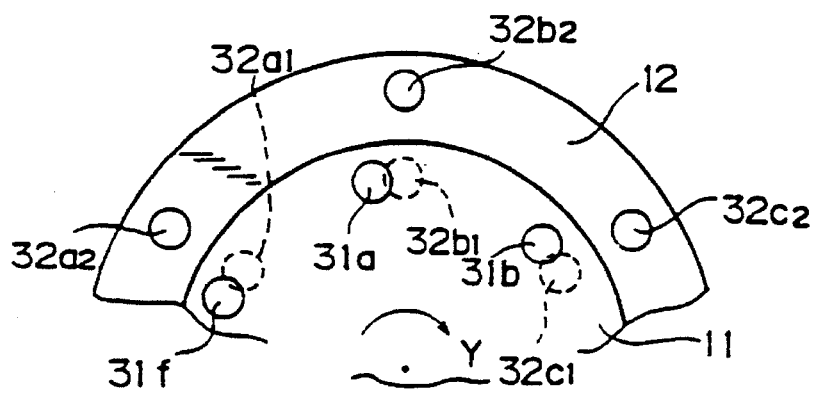

FIG. 6(b) shows the state in which the flywheel disk 11 superimposed over the flywheel disk 12 is rotated at a certain angle in the normal direction from the stationary state of FIG. 6(a). In this state, each of the permanent magnets 31a to 31f of the flywheel disk 11 are caused to rotate in the normal direction to become closer to the respective permanent magnets 32a1 to 32f1 of the flywheel disk 12 disposed right under the flywheel disk 11. As a consequence, each of the permanent magnets 31a to 31f receives the magnetic repulsion in the reverse direction from the respective permanent magnets 32a1 to 32f1 of the flywheel disk 12. At the same time, each of the permanent magnets 32a1 to 32f1 receives the magnetic repulsion from each of the permanent magnets 31a to 31f in the normal direction with the same magnitude as that of the magnetic repulsion which each of the permanent magnets 31a to 31f receives. However, as the flywheel disk 11 is suppressed from the reverse rotation by the rachet bearing 21, the magnetic repulsion acting in the reverse direction upon each of the permanent magnets 31a to 31f is converted by the action of the rachet bearing 21 into the force for urging the clockwise rotation of the permanent magnets 32a1 to 32f1 of the flywheel disk 12 disposed just below the flywheel disk 11. As a result, the flywheel disk 12 is rotated in the normal direction with the urged force having the magnetic repulsion by twice as large as when no rachet bearing is provided.

Figure 6C:
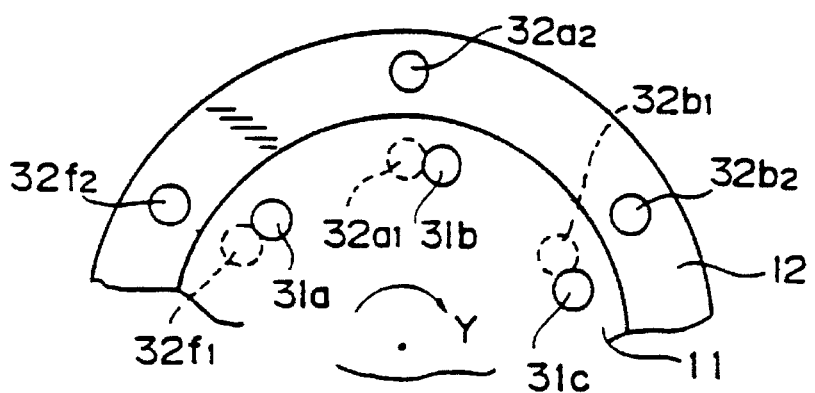

FIG. 6(c) shows the state in which the flywheel disk 12 disposed right under the flywheel disk 11 is rotated in the normal direction from the stationary state as shown in FIG. 6(a). In this state, each of the permanent magnets 32a1 to 32f1 of the flywheel disk 12 are caused to rotate in the normal direction to become closer to the respective permanent magnets 31a to 31f of the flywheel disk 11 disposed right above the flywheel disk 12. As a consequence, each of the permanent magnets 32a1 to 32f1 receives the magnetic repulsion in the reverse direction from the respective permanent magnets 31a to 31f of the flywheel disk 11. At the same time, each of the permanent magnets 31a to 31f receives the magnetic repulsion from each of the permanent magnets 32a1 to 32f1 in the normal direction with the same magnitude as that of the magnetic repulsion which each of the permanent magnets 31a to 31f receives. However, as the flywheel disk 12 is suppressed from the reverse rotation by the rachet bearing 22, the magnetic repulsion acting in the reverse direction upon each of the permanent magnets 32a1 to 32f1 is converted by the action of the rachet bearing 22 into the force for urging the clockwise rotation of the permanent magnets 31a to 31f of the flywheel disk 11 disposed just above the flywheel disk 12. As a result, the flywheel disk 11 is rotated in the normal direction with the urged force having the magnetic repulsion by twice as large as when no rachet bearing is provided.

As is apparent from the description on FIGS. 6(a) to 6(c), the magnetic repulsion produced by the permanent magnets between each of the neighboring flywheel disks, whichever disposed over or below, is efficiently converted by the clockwise rotation of the flywheel disk into the force for urging the clockwise rotation of the neighboring flywheel disk.

Then, a description will be made of the operation for starting the rotation of the rotating device according to the embodiment of this invention. First, in order to allow a ready understanding of the description, the stepping motor 2 is driven and rotated by one step to intermittently rotate the pulley 2a secured to the output shaft 2b and this rotation is transmitted to the pulley 11a with the aid of the belt 4, thereby rotating the flywheel disk 11 of the uppermost layer secured to the pulley 11a by a certain angle in the normal direction. Then, this rotation is efficiently transmitted sequentially to the flywheel disk 12 disposed just below the flywheel disk 11 through each of the flywheel disks 13 to 16 and eventually to the flywheel disk 17 of the lowest layer in a manner as will be described hereinafter, thereby resulting in the rotation of all the flywheel disks 11 to 17 by such a certain angle.

In other words, as described with reference to FIG. 6(b), the clockwise rotation of the flywheel disk 11 induces the clockwise rotation of the flywheel disk 12 disposed right under the flywheel disk 11, followed by the clockwise rotation of the flywheel disk 13 disposed just below the flywheel disk 12. This rotation is transmitted to the flywheel disk 14 disposed right below the flywheel disk 13 and sequentially to the flywheel disk disposed right below the neighboring flywheel disk, followed by transmitting the rotation eventually to the flywheel disk 17 disposed in the lowest layer and right below the flywheel disk 16 and rotating the flywheel disk 17 in the clockwise direction.

It should be noted herein, however, that each of the flywheel disks 11 to 17 fails to rotate to the extent to which the permanent magnet of the flywheel disk rotates over the position of the corresponding permanent magnet of the adjacent flywheel disk, due to the magnetic repulsion produced by the permanent magnets 31 to 37 mounted to the flywheel disks 11 to 17, respectively. In other words, there is formed a so-called "repulsion mountain" between each of the adjacent flywheel disks 11 to 17 on the basis of a repulsion field between the permanent magnets mounted to the flywheel disk and the permanent magnets mounted to the adjacent flywheel disk, and each of the respective flywheel disks 11 to 17 fails to cross over the corresponding repulsion mountain. Hence, the displacement of the position of the flywheel disk relative to the adjacent flywheel disk fails to exceed a predetermined distance between the permanent magnet and the neighboring permanent magnet and is restricted within the predetermined distance (in this embodiment, within the distance corresponding to a rotational angle of 60°).

The rotation caused on the flywheel disk 11 is then transmitted sequentially to the flywheel disks disposed under the flywheel disk 11. In this case, each of the flywheel disks 11 to 16 is so loaded with the flywheel disk disposed thereunder that each of the flywheel disks 12 to 16 of intermediate layers fails to rotate at the angle greater than the angle at which the flywheel disk placed thereabove rotate. On the other hand, when the rotational force has been transmitted eventually to the flywheel disk 17 of the lowest layer, the flywheel disk 17 starts rotating and is provided with a rotational energy because the flywheel disk 17 has no load imposed from the flywheel disposed thereunder. Once such a rotational energy is produced on the flywheel disk 17, it rotates in the normal direction up to the position ahead of the position in which the flywheel disk 16 disposed over the flywheel disk 17 has rotated forward, i.e. in the normal direction. This state is shown in FIG. 6(c). Hence, the flywheel disk 16 receives the force of urging the clockwise rotation from both of the flywheel disk 15 disposed thereabove and the flywheel disk 17 disposed thereunder, causing the flywheel disk 16 to rotate in the normal direction up to the position ahead of the position in which the flywheel disk 15 has rotated forward.

In other words, the force of urging the rotation of the flywheel disk is returned at the flywheel disk 17 and then likewise transmitted sequentially to another flywheel disk disposed above the flywheel disk disposed thereunder, eventually rotating all the flywheel disks concurrently. In order to allow a sequential transmission of the rotation from the flywheel disk of the input layer to all the rest of the flywheel disks, it is required that the flywheel disk 11 of the input layer is fed with the rotative driving power in the amount large enough to allow the rotative driving power to follow and reach the flywheel disk of the lowest layer. Once the rotative driving power has reached the flywheel disk 17 of the lowest layer, it is then returned to the flywheel disk disposed above the flywheel disk 17 and provides the flywheel disk disposed thereabove with the force of urging the clockwise rotation of the flywheel disk, then followed by transmitting the urging force sequentially to each of the flywheel disks disposed thereabove. As described hereinabove, the intermittent rotative driving power entered into the flywheel disk 11 is transmitted equally to each of the flywheel disks 12 to 17 with extreme efficiency, resulting in the clockwise rotation of all the flywheel disks 11 to 17 concurrently.

This arrangement of the flywheel disks according to the embodiment of this invention can transmit the force of urging the clockwise rotation sequentially through the flywheel disks 11 to 17 from the rotating plate of the upper layer to that of the lower layer and backwards from the rotating plate of the lower layer to the rotating plate of the upper layer as if waves go to and fro, as long as the flywheel disk 11 is intermittently fed with the rotative driving power by driving the stepping motor 2 intermittently. When the rotative driving power is kept on being supplied to the flywheel disk 11, all the flywheel disks 11 to 17 start rotating at gradually growing speeds in the normal direction. In this case, each of the flywheel disks 11 to 17 is allowed to displace its relative position within the angle predetermined between the neighboring flywheel disks relative to the flywheel disk 11. Further, all the flywheel disks 11 to 17 are rotated integrally and synchronously with each other at the same speeds. Therefore, the force is transmitted through the flywheel disks 11 to 17 from the rotating plate of the upper layer to that of the bottom layer in a wave from and when the force has reached the bottom layer, it is caused to return backwards from the rotating plate of the bottom layer to that of the upper layer in a wave form.

As the rotational speed of each of the flywheel disks 11 to 17 increases gradually in the manner as described hereinabove, each flywheel disk 11 to 17 is gradually supplied with greater rotational energy. The flywheel disk is so heavier in weight and larger in diameter than the flywheel disk disposed thereabove that particularly the flywheel disk 17 of the lowest layer fails to decelerate readily on account of a so-called "flywheel effect" even if it receives the magnetic repulsion from the flywheel disk 16 disposed thereabove in the direction opposite to the direction in which it is rotating. As a consequence, an action is caused to occur which is similar to the action produced by the rachet bearing 27 at the time of the start of rotating. In this case, too, the force of urging the clockwise rotation transmitted from the rotating plate of the upper layer sequentially to the rotating plate of the lower layer is turned at the rotating plate of the lowest layer and returned backwards to the rotating plate of the upper layer, resulting in the clockwise rotation of each of the flywheel disks 11 to 17 at a higher speed.

The flywheel disks 11 to 17 reach their higher speeds eventually and they rotate at the same angular speeds. In this state, the flywheel disk disposed therebelow can store greater rotational energy than the flywheel disk disposed thereabove because the flywheel disk disposed thereunder is larger in diameter and heavier in weight than that disposed thereabove. As a consequence, the flywheel disks 11 to 17 can store a great magnitude of rotational energy as a whole. Hence, if such a great magnitude of the rotational energy could be extracted as generated energy, the electric power can be generated in the magnitude as great as the rotational energy. The rotational energy may be taken or extracted from the flywheel disk 17 of the lowest layer; however, as the urging force is returned at the flywheel disk 17, it is preferred that the rotational energy be taken or extracted from another flywheel disk, for example, from the flywheel disk 16 of the upper layer adjacent to the flywheel disk 17 of the lowest layer, through a belt transmission mechanism.

Now, a description will be made of the rated output required by the stepping motor 2 to be employed for the rotating device according to the embodiment of this invention. The stepping motor 2 itself meets with satisfaction in direct respects as long as it is satisfied that the motor can intermittently drive only the rotation of the flywheel disk 11 of the uppermost layer. Hence, no stepping motor having large torque is required and such a stepping motor having a small size and a small rated output can meet with such requirements. In accordance with the present invention, the small-sized stepping motor 2 can be employed for driving the rotation of a flywheel disk having a heavy weight so that even the output of the small-sized stepping motor 2 can be converted with extreme efficiency into the force of rotating the flywheel disk. In other words, the stepping motor 2 can be operated with the output torque (the output torque capable of driving the rotation of the flywheel disk 11) that can demonstrate its performance to the highest extent, and the output can be converted into the force for rotating each of the flywheel disks 11 to 17 with extreme efficiency in the manner as described hereinabove. It is to be provided herein, however, that the rotative driving power of the stepping motor 2 be set to the magnitude that fails to cross over the so-called 'repulsion mountain' created between the flywheel disk 11 and the flywheel disk 12 disposed thereunder. On the contrary, once the flywheel disk 11 would rotate too much and cross over the so-called 'repulsion mountain', the flywheel disk 11 further receives the urging force in the normal direction from the flywheel disk 12 right after it has crossed over the repulsion mountain, resulting in gradually increasing the speed at which the flywheel disk 11 rotates in the clockwise rotation and eventually in running idle at a high speed.

Then, a description will be made of the relationship between the position of the rachet bearing and the positions of the permanent magnets. It can be noted that no or little considerations are required if the action of inhibiting the reverse rotation would work in substantially the entire positions of a large number of the pawls of the rachet bearing. On the other hand, when the number of the pawls thereof would be so less that there is a backlash in returning in the reverse direction, it is preferred to set the relationship between the arrangements of the pawls of the rachet bearing and the permanent magnets so as to allow the action of inhibiting the reverse rotation to act in the position in which the repulsion occurs at an appropriate magnitude.

In this embodiment of the present invention, the total magnitude of the magnetic repulsion acting between each of the neighboring flywheel disks, i.e. the flywheel disks between the upper and lower neighboring layers, is the magnitude of the magnetic repulsion produced by adding up the total number of six pairs of the upper and lower permanent magnets, respectively, each of the permanent magnet being arranged on the upper flywheel disk and disposed right above each of the lower permanent magnet disposed on the lower flywheel disk. Further, in this embodiment, the magnitude of the magnetic repulsion produced by each pair of the lower and upper permanent magnets is set to become equal to each other; however, the magnitude of the magnetic repulsion of each pair of the permanent magnets is not restricted to this mode and it may vary in such a manner that, for example, the number of the permanent magnets is set larger as the flywheel disk having a heavier weight is disposed at a lower place, thereby increasing the total magnitude of the magnetic repulsion to a greater extent. This arrangement of the number of the permanent magnets can drive the rotation of the flywheel disks disposed in lower layers and having heavier weight, without crossing over the so-called 'magnetic repulsion'. It can be noted as a matter of course that, in place of increasing the number of the permanent magnets, the magnetic force of the permanent magnets is set so as to become greater as the flywheel disks are arranged at lower locations.

Further, if the number of the permanent magnets for the flywheel disks 11 to 17 would be increased and the distance between the neighboring flywheel disks would be made closer to a sufficient extent, an axial component of the magnetic repulsion is caused to occur at a relatively great magnitude in the direction in which the axis of the center of rotation extends. This axial component can bring each of the flywheel disks 12 to 16 of intermediate layers into a substantially afloat or suspended state, thereby making the influence of friction caused by the rotational movement extremely low and rotating the flywheel disks 12 to 16 in a smooth way.

Figure 9:
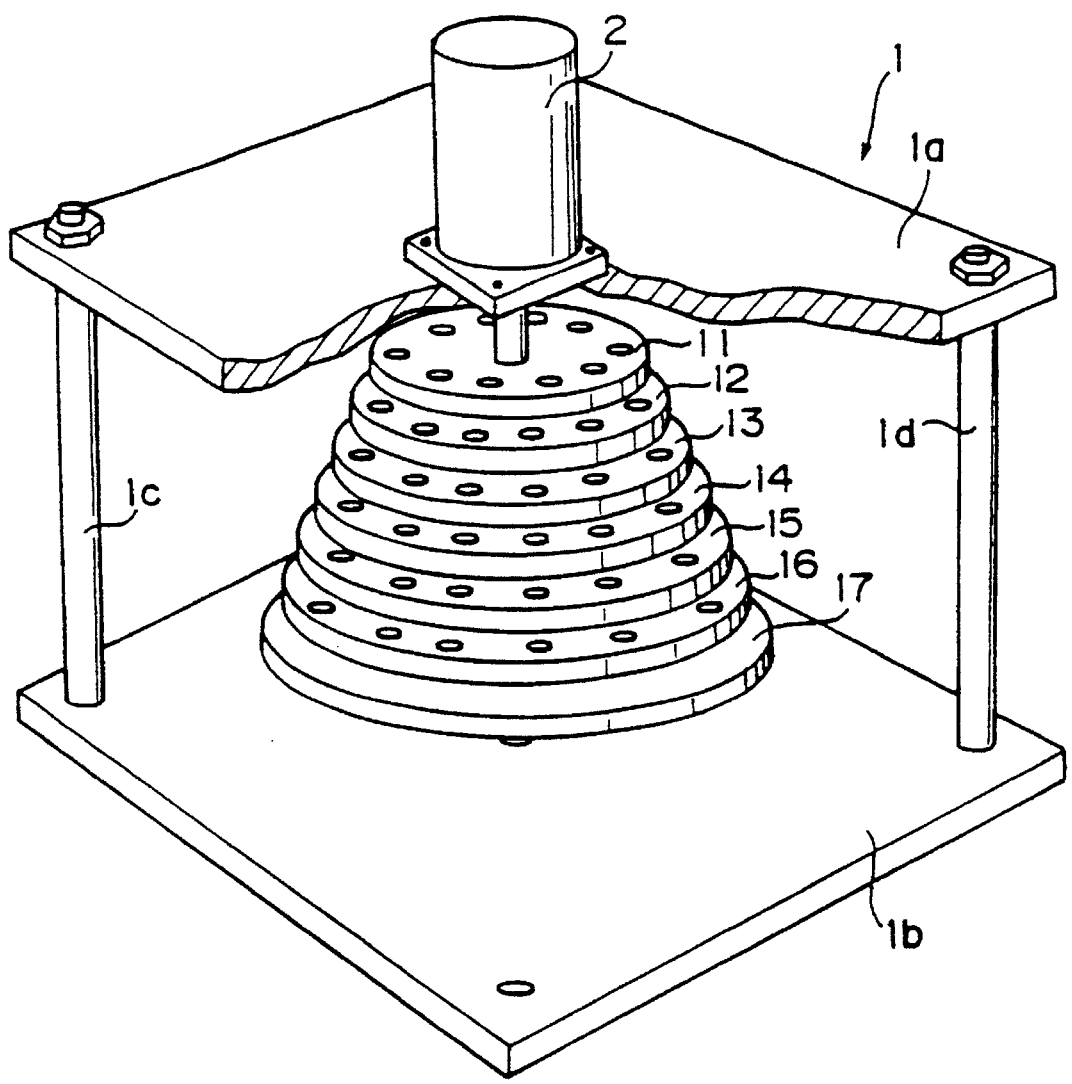
FIG. 9 is a partially cut-away, perspective view showing a rotating device according to another embodiment of the present invention.
Figure 10:
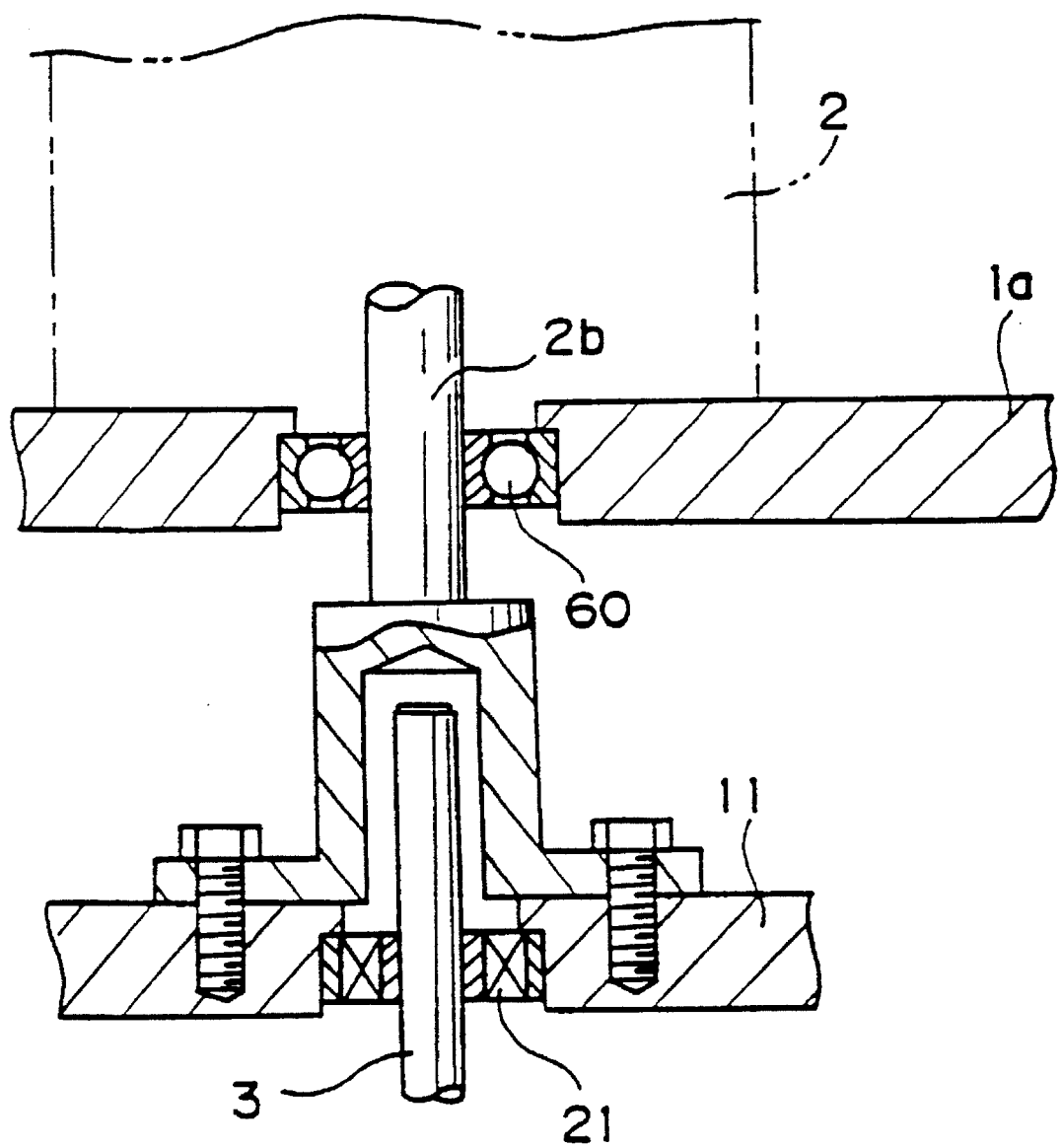
FIG. 10 is a side view in section showing the details of a driving force input mechanism portion of the rotating device according to the another embodiment of this invention.

FIG. 9 shows another embodiment of the rotating device according to the present invention and FIG. 10 shows a side view in section showing the details of the portion of the mechanism for entering the rotative driving power. In the drawings as referred to above, the same parts and elements as in the previous embodiment are provided with the same or corresponding reference numerals and symbols. In this embodiment, the output shaft 2b of the stepping motor 2 is connected directly to the flywheel disk 11, and it is mounted to the upper base 1a through a bearing 60 capable of rotating in both directions. The flywheel disk 11 is mounted to the middle axle 3 through the rachet bearing 21 in substantially the same manner as in the previous embodiment.

The actions of this rotating device according to the embodiment of this invention are substantially the same as in the previous embodiment with the exception that the rotative driving power of the stepping motor 2 is transmitted directly to the flywheel disk 11 through the output shaft 2b in place of transmitting the rotative driving power thereto through the belt transmission mechanism.

For the flywheel rotating device in the embodiment as described hereinabove, it is considered that the magnetic flux generated from the magnetic pole, e.g. North magnetic pole, exposed in one surface of the flywheel disk passes through the flywheel disk in the position between the circumferentially adjacent magnetic poles on the same surface and returns to the opposite magnetic pole, e.g. South magnetic pole, on the rear side of the flywheel disk. Hence, when looked from the one surface of the flywheel disk, the South magnetic pole can magnetically be seen, although weak, in the position between the adjacent North magnetic poles existing on the same surface of the flywheel disk. This South magnetic pole has the action of pulling the North magnetic pole arranged on the facing surface of the flywheel disk of the neighboring layer. As a consequence, the facing North magnetic poles of the flywheel disk are decreased to some extent with respect to the clockwise rotation due to the influence of the South magnetic poles. In other words, this relationship may be described by comparison to the relationship between the mountain of the magnetic repulsion and the "bottom" thereof. In this case, the bottom of the magnetic repulsion would be too deep so that the neighboring flywheel disk cannot cross over the bottom of the magnetic repulsion. In such a state, the force of urging the clockwise rotation between each of the neighboring layers can not be transmitted in an efficient fashion. An embodiment that can solve such problems will now be described hereinafter.

Figure 11:
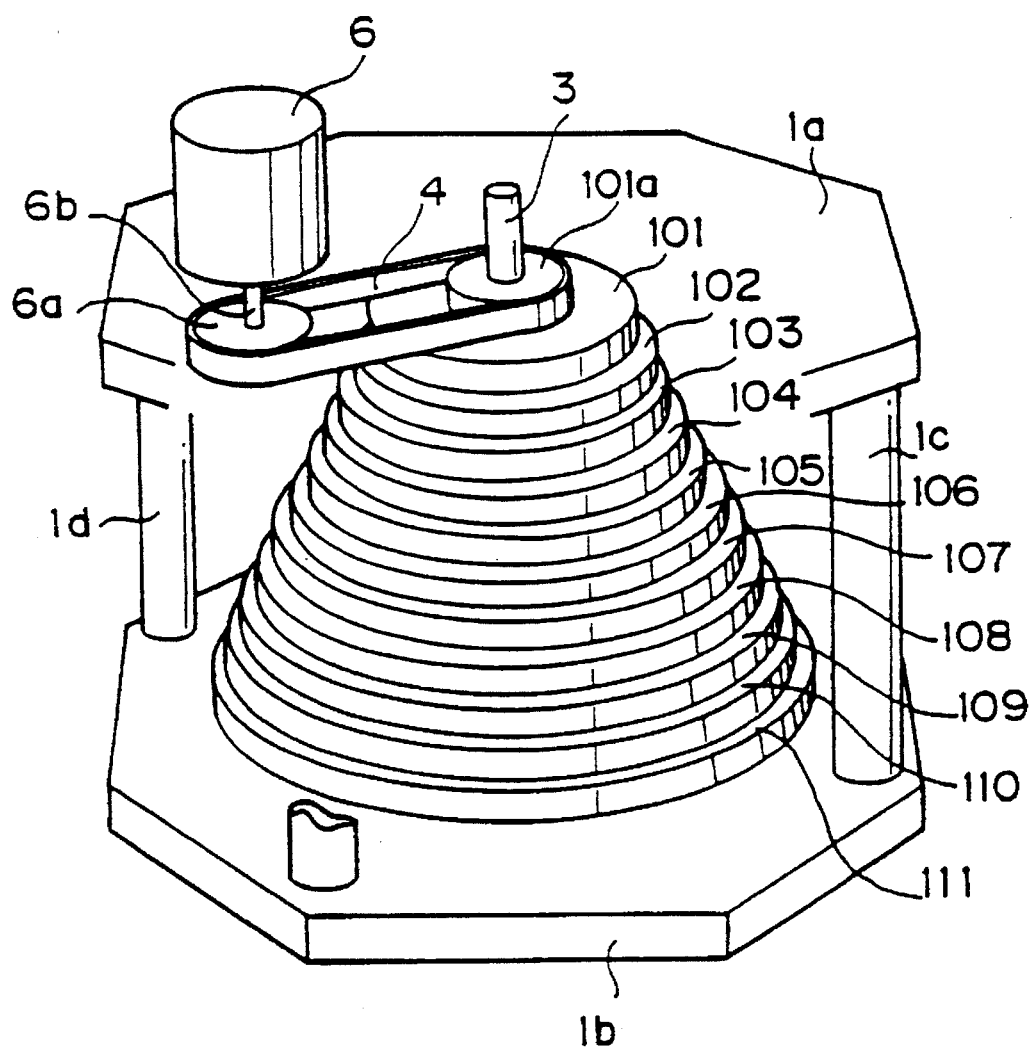
FIG. 11 is a partially cut-away, perspective view showing a rotating device according to a still further embodiment of this invention.
Figure 12:
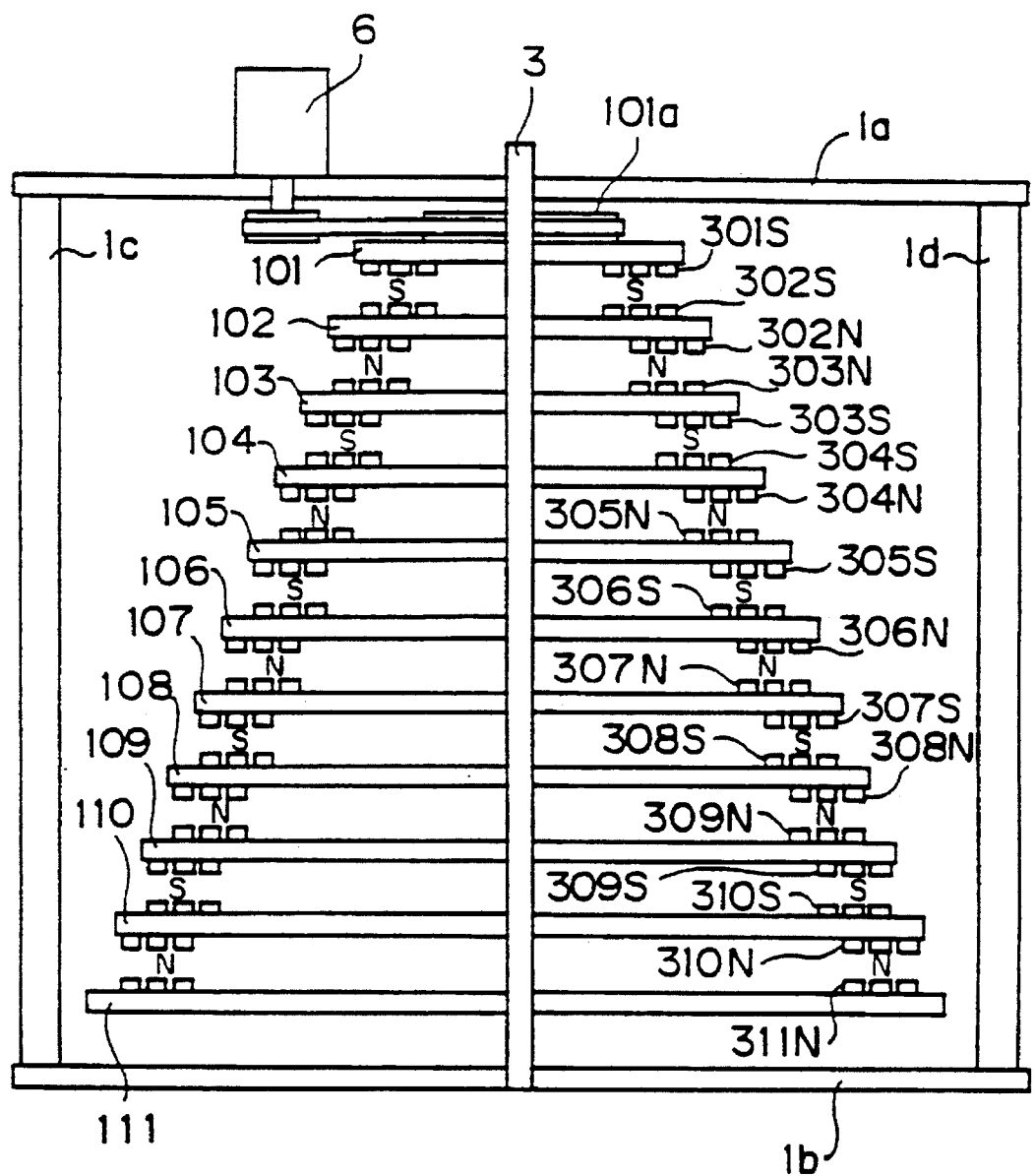
FIG. 12 is a side view showing the rotating device according to the still further embodiment of this invention.
Figure 13:
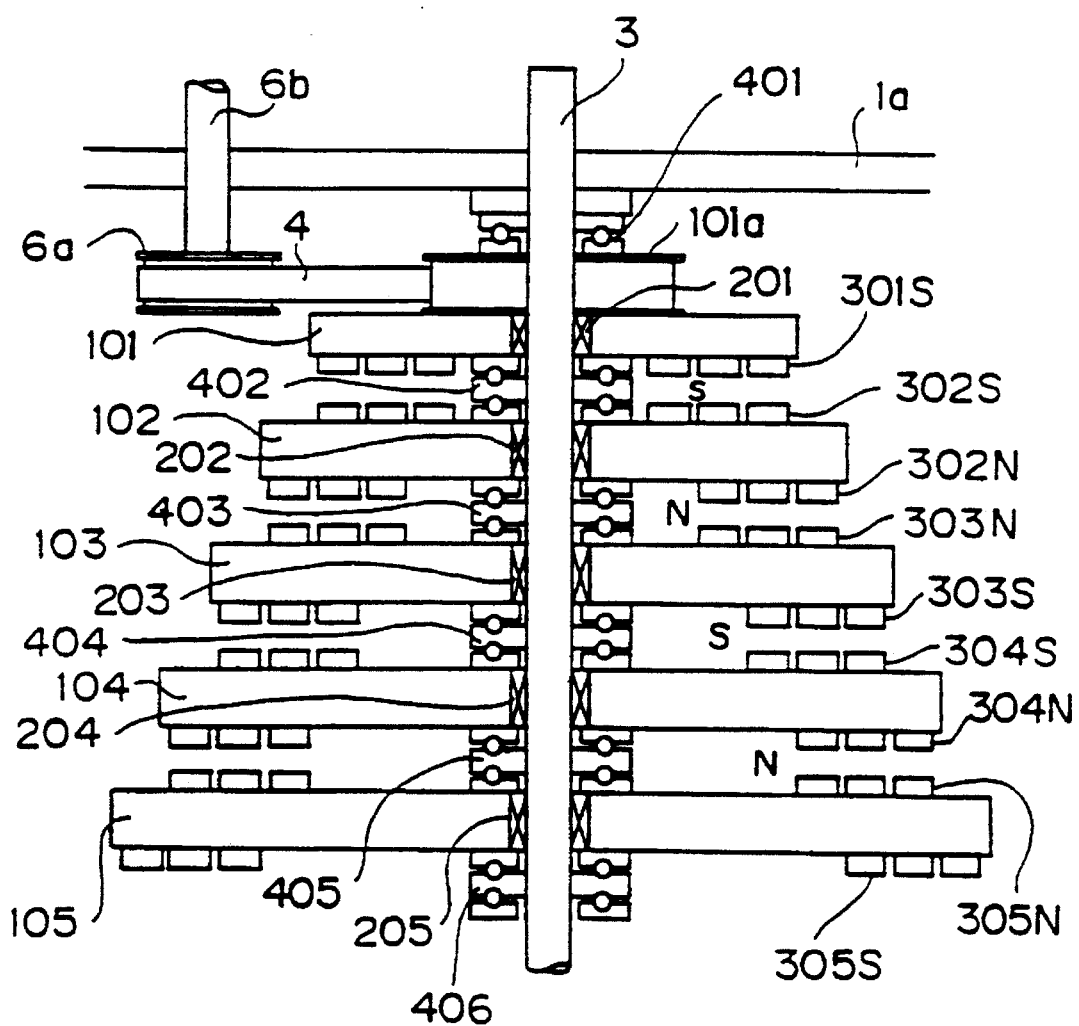
FIG. 13 is a side view in section showing the details of a driving force input mechanism portion of the rotating device according to the still further embodiment of this invention.
Figure 14:
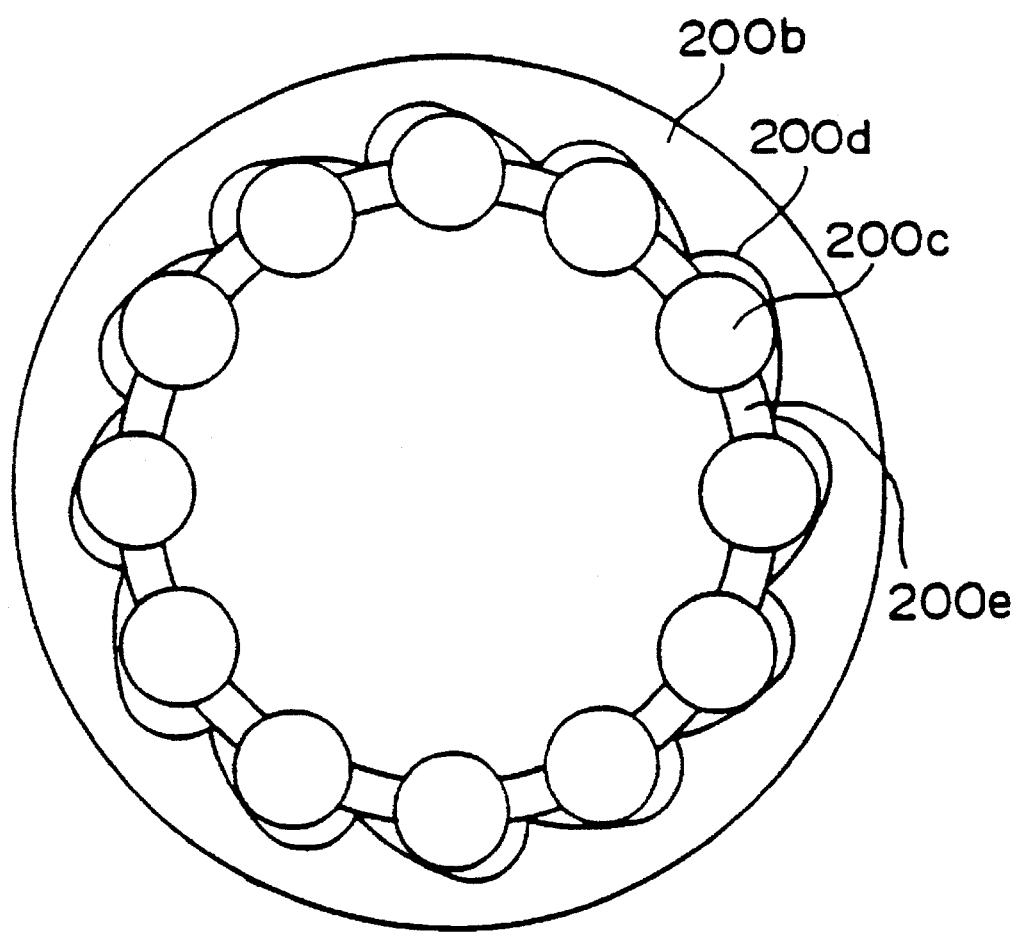
FIG. 14 is a view showing another example of the structure of a rachet bearing.

FIG. 11 is a perspective view showing the rotating device according to the still further embodiment of this invention; FIG. 12 is a side view showing the rotating device thereof; FIG. 13 is aside view in section showing the details of the driving force input mechanism portion of the rotating device thereof; and FIG. 14 is a view showing an example of the structure of a rachet bearing to be mounted to the flywheel disk of the rotating device according to this embodiment.

As shown in the drawings as referred to above, a support frame 1 comprising upper and lower bases 1a and 1b, support columns 1c and 1d, and so on is attached to a middle axle 3 to which the total number of eleven flywheel disks 101 to 111 are mounted with their rotational axes aligned coaxially and with the flywheel disks arranged in layers in a spaced relationship equally apart from each other. Each of the flywheel disks 101 to 111 is mounted to the middle axle 3 through the respective rachet bearing 201 to 211.

Each of the rachet bearings 201 to 211 functions as a one-way clutch that can allow the flywheel disks 101 to 111, respectively, to rotate in the normal direction (in this embodiment, the rotation in the clockwise direction) and to inhibit the reverse rotation in the opposite direction. Each of the rachet bearings 201 to 211 may have a conventional structure as shown in FIG. 4. For example, when a spherical rachet bearing as shown in FIG. 14 is employed, it comprises an outer race 200b, bearings 200c, a groove portion 200d and springs 200e. Such a spherical rachet bearing is particularly effective for increasing the number of positions in which the reverse rotation is blocked.

Like those in the previous embodiment as described hereinabove, the flywheel disks 101 to 111 are also arranged such that each of them is set to become larger in radius r by a constant length g and heavier in weight as it is arranged in a lower layer and that the smaller and lighter flywheel disk is superimposed on the flywheel disk larger by the constant length g in radius r and heavier than the flywheel disk disposed right thereabove in such a manner that the smallest and lightest flywheel disk 101 is disposed in the uppermost layer and the largest and heaviest flywheel disk 111 is disposed in the lowest layer and each of the neighboring layers is placed in a spaced relationship apart equally from each other. Further, free bearings 401 to 411 are mounted between each of the neighboring layers, respectively, coaxially about the middle axle 3, in order to allow a smooth rotation of each of the flywheel disks 101 to 111.

To the flywheel disk 101 of the uppermost layer is secured a pulley 101a which in turn is connected through a belt 4 to a pulley 6a mounted to an output shaft 6b of a driving motor 6. As the driving motor 6, there may be employed, for example, a motor including a stepping motor or a servo motor, which can generate a rotative driving power intermittently.

Figure 15:
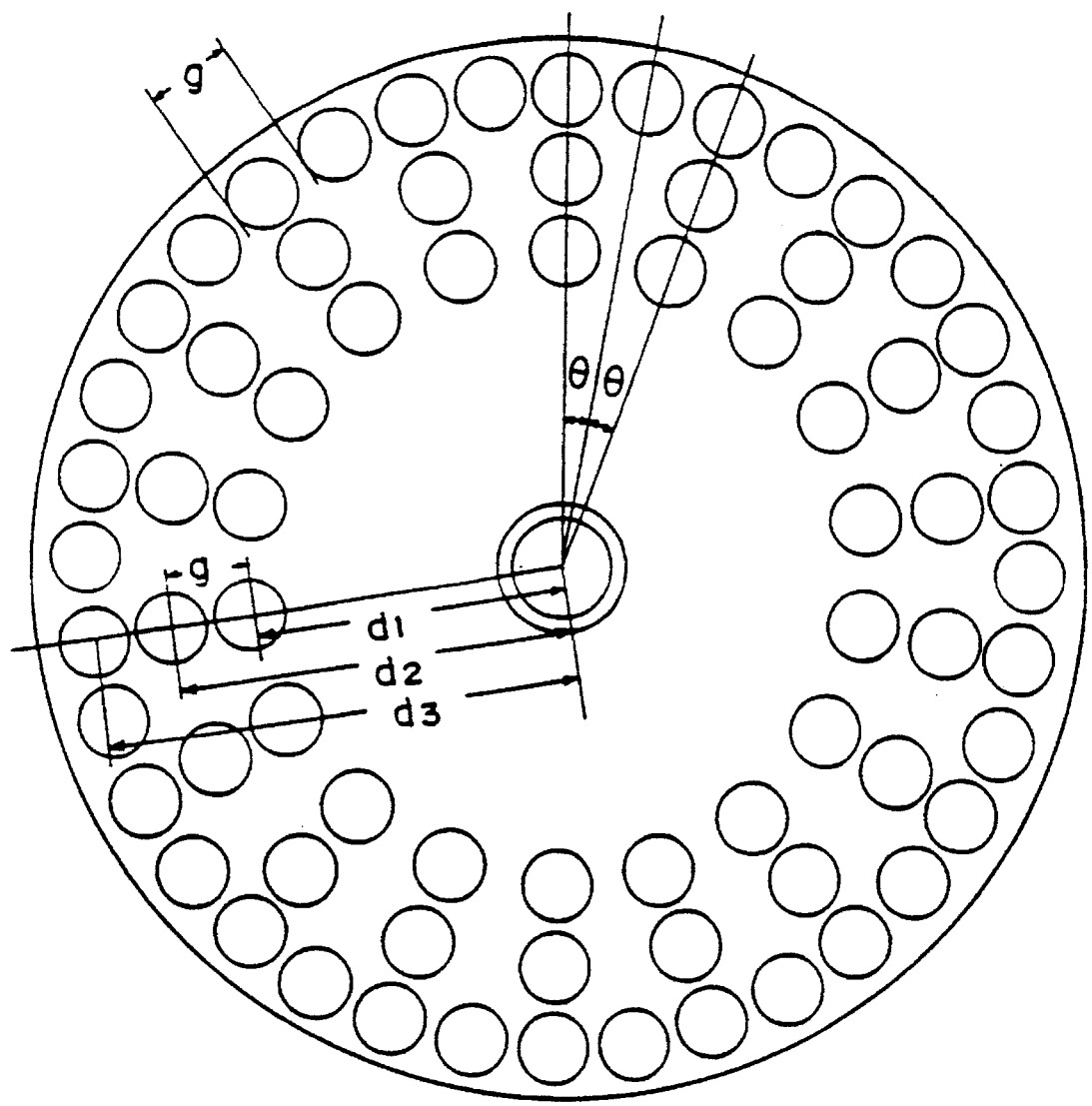
FIG. 15 is a schematic representation showing an arrangement of the positions of permanent magnets for a flywheel disk in the rotating device according to the still further embodiment of this invention.

To the surface of each of the flywheel disks 101 to 111 are mounted permanent magnets, referred in generic terms to as 301 to 311, respectively. Each of the permanent magnets 301 to 311 disposed on each of the respective flywheel disks may be in a small disk shape having an equal diameter as shown in FIG. 15. The permanent magnets mounted to each flywheel disk are arranged in such a manner that the magnetic poles of the permanent magnets disposed on one flywheel disk are made equal in polarity to the magnetic poles of the permanent magnets on the surface of another flywheel disk of the neighboring layer and facing the surface of the one flywheel disk. In other words, for example, the polarity on the surfaces of the permanent magnets disposed on the flywheel disk 101 and the flywheel disk 102 of the neighboring layer is set to South magnetic poles between the corresponding flywheel disks; the polarity of the permanent magnets between the flywheel disk 102 and the flywheel disk 103 of the neighboring layer is set to North magnetic poles; the polarity of the permanent magnets between the neighboring flywheel disks 103 and 104 is set to South magnetic poles; and the polarity of the permanent magnets between the neighboring flywheel disks 104 and 105 is set to North magnetic poles. Likewise, the polarity of the permanent magnets between each of the neighboring flywheel disks 105 to 110 is set alternately to South or North magnetic poles. Eventually, the polarity of the permanent magnets between the neighboring flywheel disks 110 and 111 is set to North magnetic poles. As shown in the drawings, the polarity of each permanent magnet is represented by reference symbols "N" and "S" provided after reference numerals 301 to 311, inclusive.

FIG. 15 shows an example of the arrangement of the positions of the permanent magnets for the flywheel disk. In this example, the flywheel disk is provided with three coaxial circles, each being set to become larger by a constant length g from the axis of rotation of the flywheel disk than that of the neighboring flywheel disk and having a radius (d1, d2 and d3, respectively), and the permanent magnets are disposed in each of the coaxial circles. Each of the permanent magnets is arranged on the circumference of each of the inner circle and the intermediate circle at an angle 2θ with respect to the axis of rotation. The permanent magnets arranged on the inner circle and the intermediate circle are referred to as a first group of magnetic poles. On the other hand, each of the permanent magnet is arranged on the circumference of the outer circle at an angle θ with respect to the axis of rotation. The permanent magnets arranged on the outer circle are referred to as a second group of magnetic poles. In the first group of the permanent poles, the relationship represented by the following formula:

(diameter of permanent magnet)+(distance from the neighboring permanent magnet)=g becomes constant, and this relationship is satisfied by all the flywheel disks 101 to 111.

In this embodiment, the permanent magnets are disposed on the surfaces of the flywheel disks of the neighboring layers in an equal arrangement. In other words, when the neighboring flywheel disks are in a stationary state and the magnetic repulsion is in a balanced state, on the one hand, the permanent magnets of the first group on the surface of the flywheel disk of the upper neighboring layer are arranged alternately with those of the first group on the surface of the flywheel disk of the lower neighboring layer and, on the other hand, the permanent magnets of the second group on the surface of the flywheel disk of the upper neighboring layer are arranged overlapping with those of the second group on the surface of the flywheel disk of the lower neighboring layer.

Figure 16:
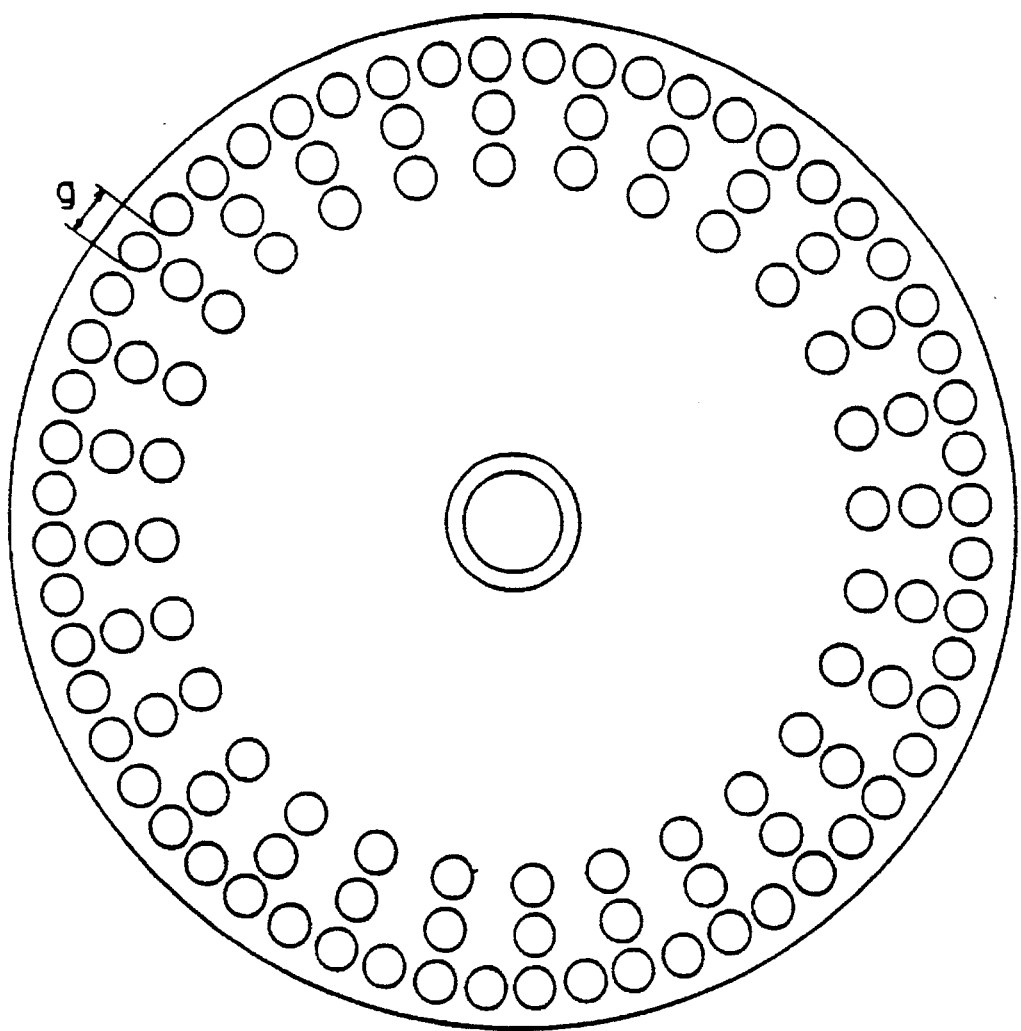
FIG. 16 is a schematic representation showing another example of the arrangement of the positions of permanent magnets for a flywheel disk in the rotating device according to the still further embodiment of this invention.

As the flywheel disk is larger in size, the circle of the flywheel disk on which the permanent magnets are to be arranged may become larger in diameter, for example, as shown in FIG. 16. At the same time, the number of the permanent magnets to be arranged, for example, on the outer circle is increased compared with the number of the permanent magnets as shown in FIG. 15. However, as described hereinabove, the constant length g is set to the same value for all the flywheel disks 101 to 111. On the other hand, although the angle with respect to the axis of rotation, at which each of the permanent magnets is arranged, may vary with each of the flywheel disks 101 to 111, the fact that the angle at which each of the permanent magnets of the second group is arranged on the outer circle of each flywheel disk is set to a half of the angle at which each of the permanent magnets of the first group is arranged on the inner circle and intermediate circle of each flywheel disk is likewise applied without any changes to each of the flywheel disks 101 to 111.

As described hereinabove, the flywheel disks 101 to 111 are arranged such that the number of the permanent magnets is increased as the flywheel disks of the lower layers are larger in size, thereby making the magnetic repulsion acting between the neighboring layers greater. This arrangement can avoid the disconnection of the magnetic repulsion between the neighboring layers (in other words, crossing over the so-called 'repulsion mountain' of the magnetic repulsion), even when the heavier flywheel disk of the lower layer is to be rotated.

In this embodiment of the rotating device according to the present invention, the flywheel disks 101 to 111 are mounted to the support frame 1 by pressing them from both of top and bottom so as to make the distances between each of the neighboring layers smaller. In this case, the magnetic repulsion acts in the axial direction of the middle axle 3 as well as in the circumferential direction of rotation between each of the neighboring flywheel disks 101 to 111 by the permanent magnets 301 to 311, respectively, mounted thereto. The magnetic repulsion acting in the axial direction of the middle axle 3 becomes very strong because a number of the permanent magnets are mounted on the flywheel disk so that the weight of each of the flywheel disks 102 to 110 of the intermediate layers is canceled due to the balance between the magnetic repulsions acting from both of above and below and that each of the flywheel disks 102 to 110 is brought into a substantially afloat or suspended state. Hence, each flywheel disk can be rotated in an extremely smooth fashion because the rotational friction exerts no or little substantial influence upon the rotation of the flywheel disks.

Then, a description will be made of the actions and operations of the rotating device according to this embodiment of this invention.

First, the basic action of this rotating device is substantially the same as in the previous embodiments of the rotating devices according to the present invention as described hereinabove. In other words, the basic action comprises transmitting the rotative driving power entered into the flywheel disk 101 of the uppermost layer equally through the flywheel disks 102 to 110 eventually to the flywheel disk 111 of the lowest layer as if waves run and then turning the rotative driving power at the flywheel disk 111, followed by returning backwards sequentially to the flywheel disks of the upper layer as the force of urging the clockwise rotation of the flywheel disks of the upper layers. In this embodiment, this basic action is realized mainly by the first group of the magnetic poles of the permanent magnets arranged on the inner circle and the intermediate circle of each of the flywheel disks.

In other words, as shown in FIG. 17, when each of the flywheel disks 101 to 111 is in a stationary state, the first group of the permanent poles (as represented by white circles in the drawing) arranged on the inner circle and the intermediate circle of the flywheel disk are in such a state as balanced with the first group of those (as represented by hatched circles in the drawing) arranged on the inner circle and the intermediate circle of the flywheel disk of the neighboring layer and the former is arranged alternately with the latter in a stationary state. For brevity of explanation, given the first and second groups of the permanent poles disposed on the neighboring flywheel disks are arranged all as North magnetic poles, weak South magnetic poles can be said to be seen between the circumferentially adjacent permanent magnets of the first group of the North magnetic poles in the manner as described hereinabove.

In this state, on the other hand, the second group of the North magnetic poles on the outer circle of the flywheel disk is arranged so as to overlap with the second group of the North magnetic poles on the flywheel disk of the neighboring layer so that the magnetic repulsion little acts in the direction of rotation and instead a large magnitude of the magnetic repulsion acts in the vertical direction. The vertical magnetic repulsion of the second group of the North magnetic poles can be seen as if it negate the attraction by the South magnetic poles seen in the middle of the adjacent permanent magnets in the first group of the North magnetic poles, when looked from the first group of the North magnetic poles on the neighboring flywheel disk. Hence, even if the permanent magnets are arranged in the manner as shown in FIG. 17, the flywheel disks can be rotated with ease.

Figure 18:
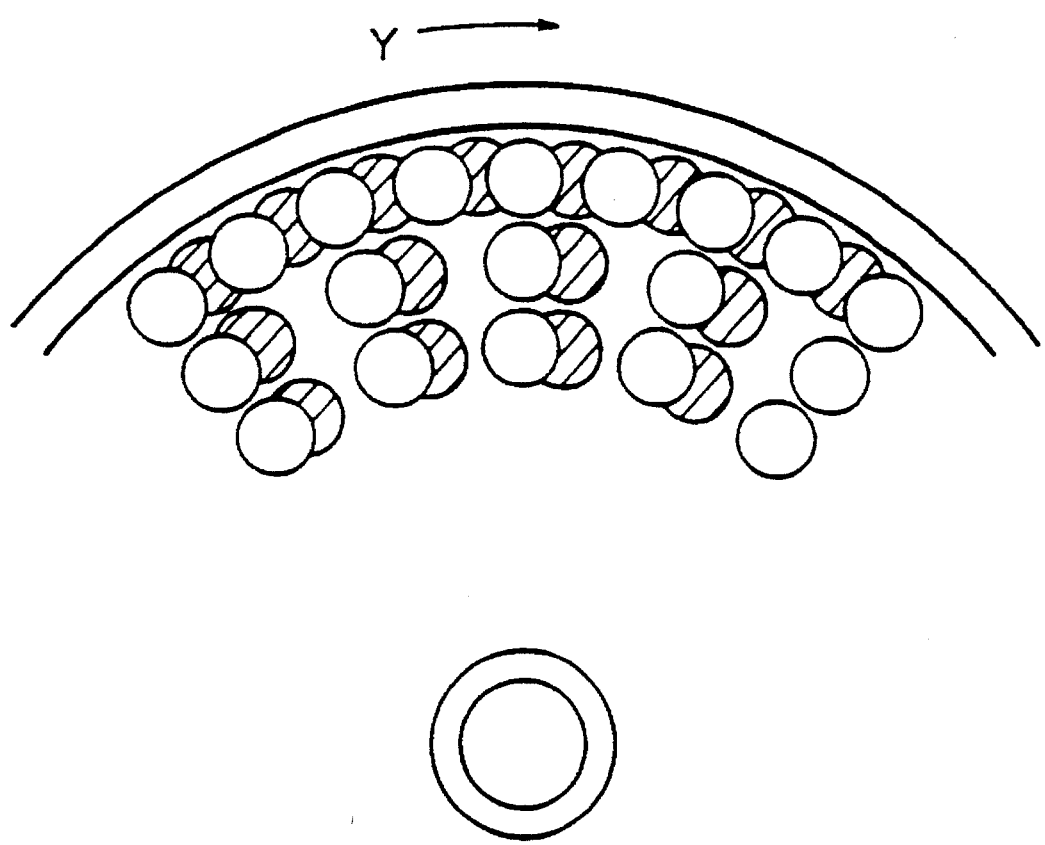
FIG. 18 is a Schematic representation showing the arrangement of the positions of the permanent magnets for the flywheel disk according to the still further embodiment of this invention for describing the action of the permanent magnets when the upper flywheel disk is rotated in the normal direction.
Figure 19:
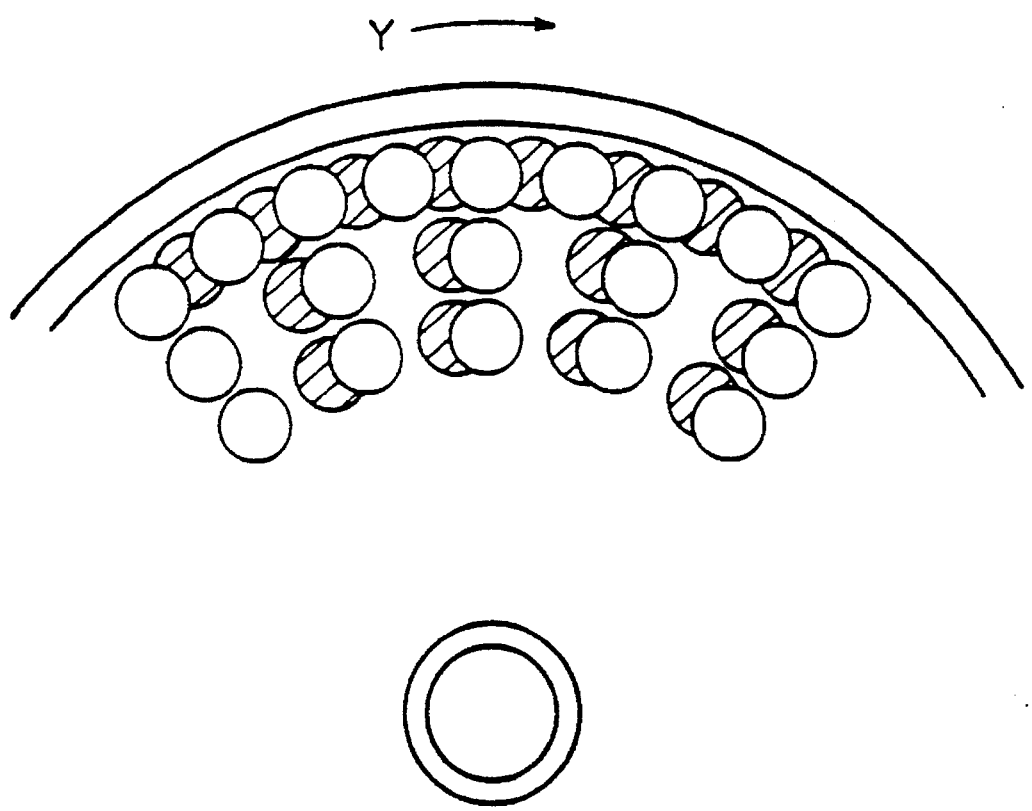
FIG. 19 is a schematic representation showing the arrangement of the positions of the permanent magnets for the flywheel disk according to the still further embodiment of this invention for describing the action of the permanent magnets when the lower flywheel disk is rotated in the normal direction.

Further, for example, as shown in FIG. 18, when the flywheel disk of the upper neighboring layer is rotated in the normal direction (i.e. in the direction as indicated by the arrow Y in the drawing), it is caused to act its magnetic repulsion upon the flywheel disk of the lower neighboring flywheel disk without rotating in the reverse direction due to the action of the rachet bearing, thereby rotating the flywheel disk of the lower neighboring layer in the normal direction. Likewise, as shown in FIG. 19, as the flywheel disk of the lower neighboring layer is rotated in the normal direction (i.e. in the direction as indicated by the arrow Y in the drawing), it is caused to act its magnetic repulsion upon the flywheel disk of the upper neighboring flywheel disk without rotating in the reverse direction due to the action of the rachet bearing, thereby rotating the flywheel disk of the upper layer in the normal direction. This action is substantially the same as described with reference to FIG. 6.

Then, a description will be made of the instance where the flywheel disk is rotated at a very slight angle from the position as shown in FIG. 17 in this embodiment of the rotating device according to the present invention. In this instance, this arrangement of the magnetic poles of the permanent magnets is less sensitive to the rotational movement at such a very slight angle and no or little magnetic repulsion is caused to occur in the first magnetic pole group of the permanent magnets because the permanent magnets in the first magnetic pole group are apart in distance between the permanent magnets on the neighboring flywheel disks of the upper and lower layers; however, on the other hand, the second magnetic pole group of the permanent magnets is very sensitive to even such a slightly angular movement producing a large magnitude of magnetic repulsion because the second magnetic pole group of the permanent magnets is arranged in an overlapped state, thereby converting the resulting magnetic repulsion into the force of urging the clockwise rotation of the flywheel disks.

Figure 20:
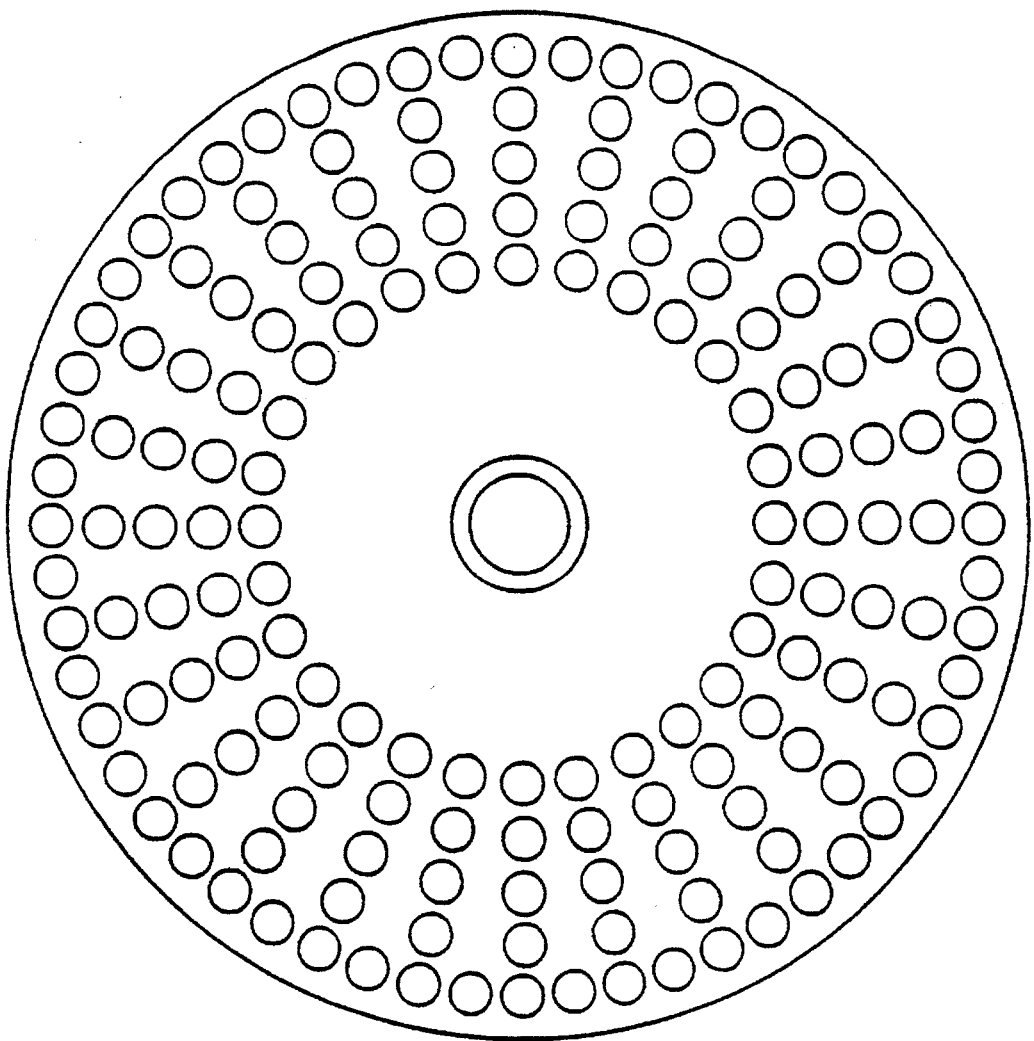
FIG. 20 is a schematic representation showing another example of the arrangement of the positions of permanent magnets for a flywheel disk.

In the rotating device according to the present invention, when the rotational energy is sought to be stored by rotating the flywheel disks heavier in weight, the polarity of the first magnetic pole group is made stronger to thereby make the magnetic connection between the upper and lower neighboring flywheel disks higher by the magnetic repulsion. FIG. 20 shows an example of the arrangement of the permanent magnets which can satisfy the requirements as described hereinabove, in which the number of the permanent magnets in the first magnetic pole group is increased in the radial direction of the flywheel disk. In the example as shown in FIG. 20, the number of the permanent magnets in the first magnetic pole group is increased by two each in the axial direction to four, compared with the number of the permanent magnets as shown in FIG. 15, thereby strengthening the polarity of the first magnetic pole group.

Figure 21:
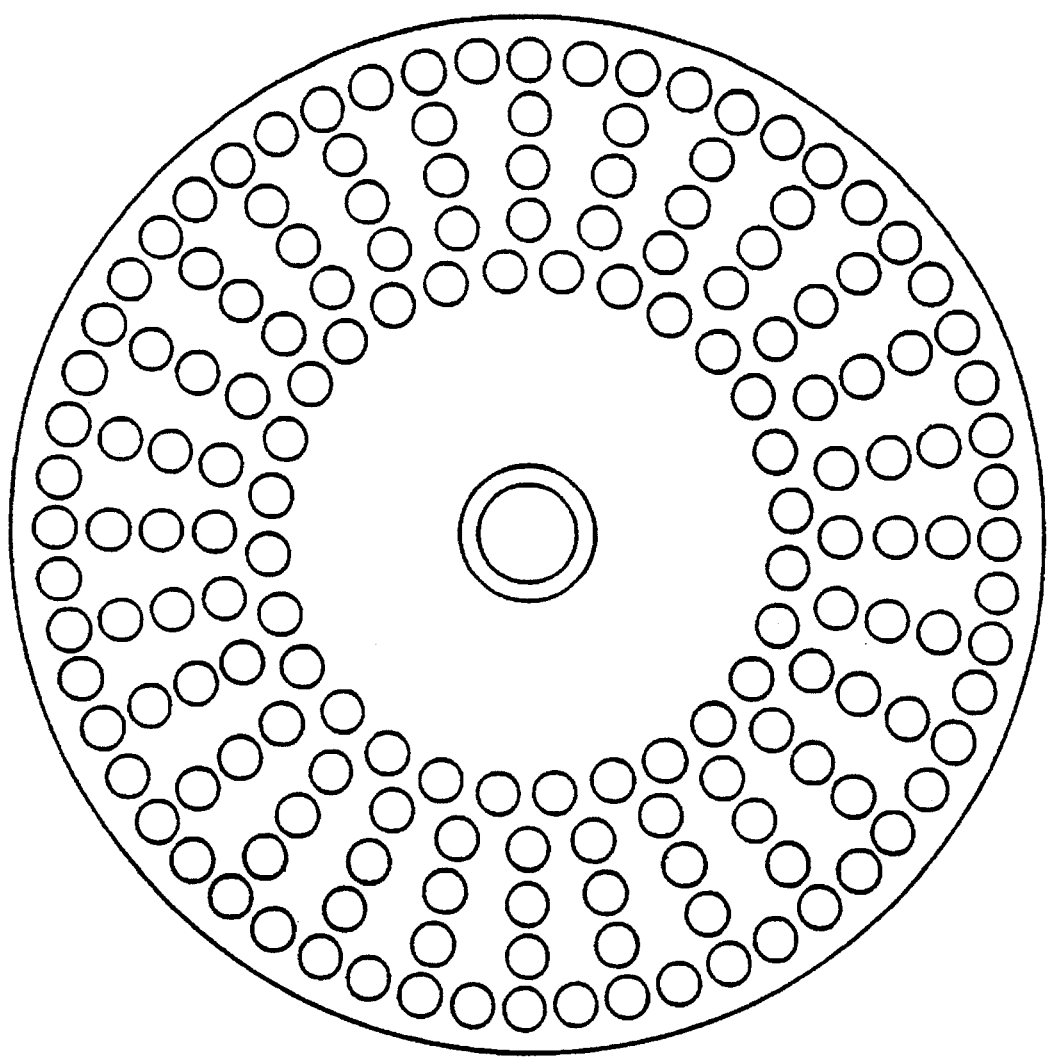
FIG. 21 is a schematic representation showing a further example of the arrangement of the positions of permanent magnets for a flywheel disk.

On the other hand, when the action of the second magnetic pole group of the permanent magnets is sought to be strengthened, an additional set of the second magnetic pole group of the permanent magnets may be arranged on the innermost circle in the manner, for example, as shown in FIG. 21. In the example of FIG. 21, the permanent magnets to be disposed on the innermost circle of the flywheel disk of the upper neighboring layer are arranged so as to overlap with those disposed on the flywheel disk of the lower neighboring layer, when the flywheel disks are in stationary state, thereby constituting an additional second magnetic pole group.

In the rotating device according to the embodiment of this invention, the first magnetic pole group of the permanent magnets can be said to contribute mainly to an increase in the power of the rotating device, while the second magnetic pole group of the permanent magnets can be said to contribute mainly to an increase in the rotational speed of the flywheel disks.

As described hereinabove, the rotating device according to the embodiment of this invention can convert the input energy very efficiently into the rotational energy for rotating all the flywheel disks because it is arranged likely to allow the flywheel disk to rotate at a very slight angle and it can very efficiently convert even such a very slight rotation into the force of urging the clockwise rotation of the flywheel disks, in addition to a large magnitude of rotation of the flywheel disks.

Figure 22:
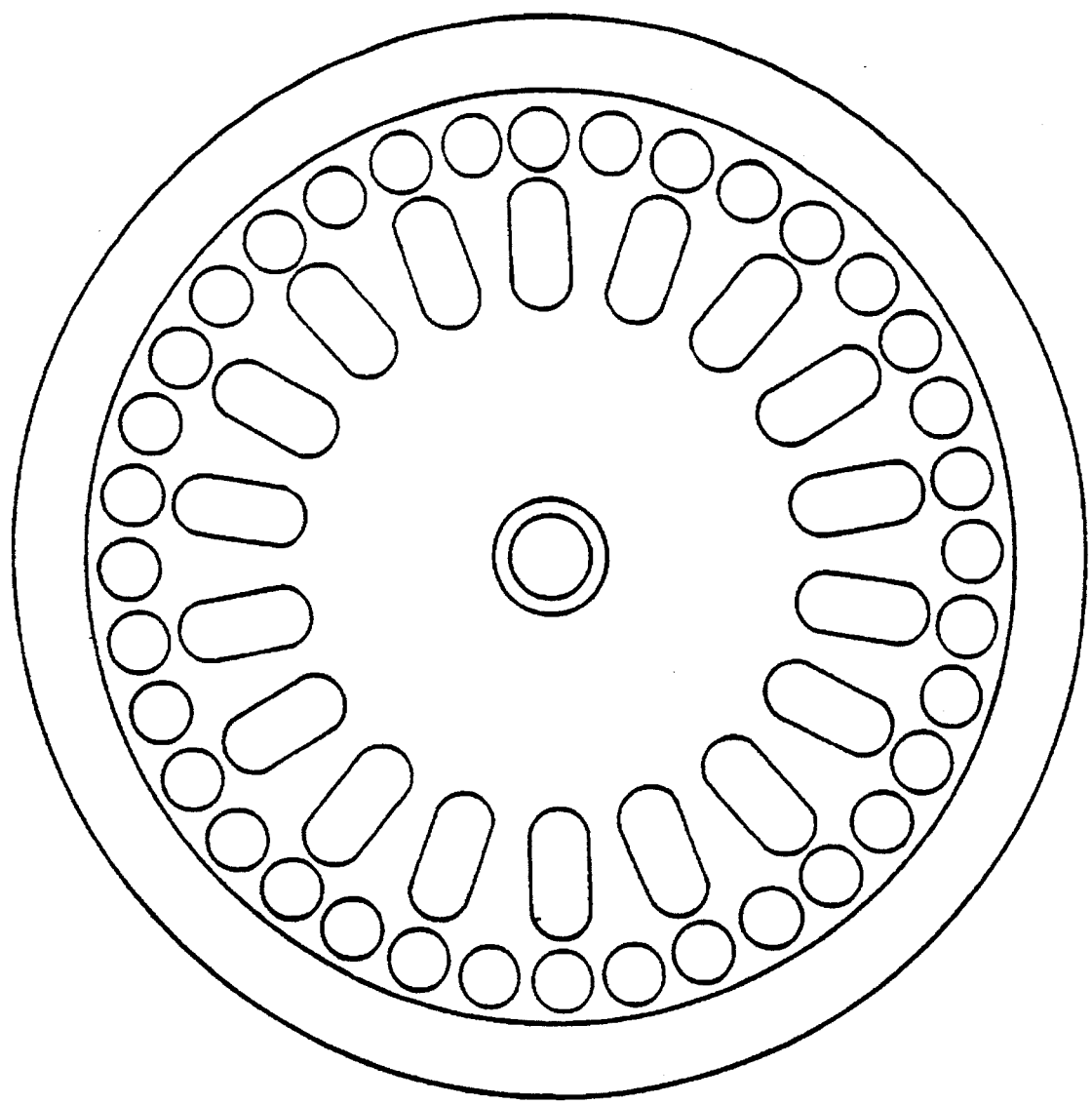
FIG. 22 is a schematic representation showing a still further example of the arrangement of the positions of permanent magnets for a flywheel disk.
Figure 23:
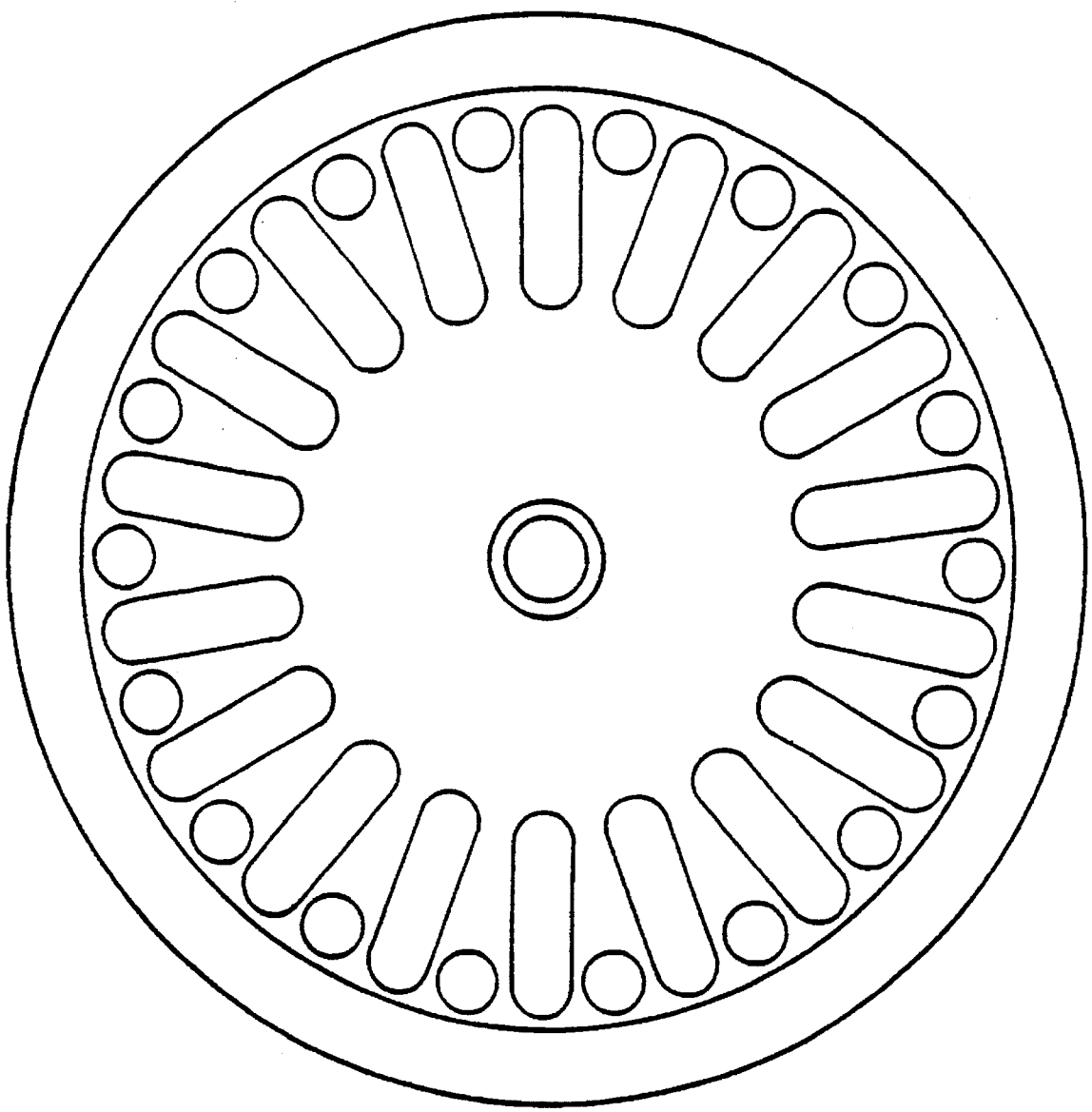
FIG. 23 is a schematic representation showing a still further example of the arrangement of the positions of permanent magnets for a flywheel disk.

It is to be noted that, although the permanent magnets mounted to each of the flywheel disks may generally be arranged alternately so as for their polarity to have North magnetic poles, South magnetic poles, North magnetic poles, South magnetic poles, . . . in this order, the arrangement of the polarity of the permanent magnets is not restricted to this mode and it is also possible to arrange the permanent magnets on all the layers so as to show the equal polarity, for example, North magnetic poles. In addition, the shape of the permanent magnet is not restricted to a circler shape in section. For example, as shown in FIG. 22, one set of the permanent magnets in the first magnetic pole group may be of a flat shape, rectangular in section with a pair of sides rounded, or, as shown in FIG. 23, a portion of the permanent magnets in both of the first magnetic pole group and the second magnetic pole group may be combined into a flat shape, rectangular in section with a pair of sides rounded.

Further, the present invention is not restricted to an example of the specific arrangement of the first and second magnetic pole groups on each of all the flywheel disks 101 to 111. For example, it is also possible to arrange only the first magnetic pole group on the flywheel disk of the input layer and to arrange both of the first magnetic pole group and the second magnetic pole group on each of the rest of the flywheel disks.

It is further to be noted that various modifications and changes are also possible in practicing the present invention.

For example, in each of the embodiments of the rotating devices as described hereinabove, the rachet bearing for preventing the reverse rotation is mounted to each of all the flywheel disks; however, the present invention is not restricted to this arrangement. For instance, the sufficient effect can be achieved even when the rachet bearing is mounted to only the flywheel disk of the uppermost layer into which the rotative driving power is entered or the reverse rotation that may be caused by the influence during the extraction of the load can be suppressed by mounting the rachet bearing to the flywheel disk of the output layer from which the output is taken or extracted (for example, the flywheel disk of the second lowest layer). It is further possible to mount the rachet bearing to a combination of those layers. In addition, even if no rachet bearing would be mounted to any flywheel disk, it is also possible to efficiently convert the entered rotative driving power into the rotation of the flywheel disk of each layer. Although the effect achieved by this arrangement, however, is less efficient than the examples as described hereinabove, this embodiment can achieve the object of this invention so that this embodiment can also be understood to be encompassed within the scope of this invention.

It is further to be noted that, although the rachet bearing is employed as the means for inhibiting the reverse rotation of the flywheel disk, this invention is not restricted to the rachet bearing and it may comprise any various means as long as it can inhibit the reverse rotation of the flywheel disk, that is, as long as it can perform the function as a one-way clutch.

In the embodiments as described hereinabove, the stepping motor capable of intermittently generating the rotative driving power is employed as a source for generating the rotative driving power. It can be noted, however, that the source for generating the rotative driving power is not restricted to the such stepping motor and a servo motor or the like can also be employed. Further, it may also be possible to use a mechanism capable of intermittently supplying the rotative driving power of a usual motor to the flywheel disk of the uppermost layer by means of an electromagnetic clutch or any other device or to use a mechanically rotation-driving device capable of generating an intermittent rotative driving power. In addition, the rotative driving power to be entered into the rotating device according to the present invention is not restricted to the type of being intermittently entered and it may be rotative driving power of such a type as being continually entered by a usual motor. It should be noted herein that, although the continual entry of the rotative driving power is less efficient for achieving the effects sought to be performed by the rotating device according to the present invention than the intermittent entry of the rotative driving power, the effects can be said to be satisfactory. Further, when the rotative driving power is continually entered, it is preferred that it is combined with the disposition of the rachet bearing. In this case, however, the entry of the intermittent rotative driving power is more effective and particularly so at the time when the rotating device starts rotating.

In the embodiments of the rotating devices according to the present invention, each of the permanent magnets is arranged on the same circumference of the circle at an equal angle and in an equally angularly spaced relationship relative to the adjacent permanent magnet. The present invention, however, is not restricted to this arrangement and any arrangement can be accepted as long as the permanent magnets are disposed in such a manner that the 'repulsion mountain' and the 'bottom' of the magnetic repulsion caused to occur between the flywheel disks of the neighboring layers are arranged so as to become engaged with each other at a certain location between the flywheel disks of the neighboring layers.

Further, in the embodiments of the rotating devices according to the present invention, the permanent magnets are employed as the means for generating the magnetic repulsion between the neighboring flywheel disks. It should be noted, however, that the present invention is not restricted to those permanent magnets and an electric magnet may also be employed. Furthermore, a superconductive electric magnet can provide an extremely great magnitude of repulsion, thereby capable of rotating the flywheel disks of a considerably heavy weight. It can further be noted as a matter of course that the permanent magnets can be combined with the electric magnets. In addition, it is effective to use the permanent magnets when the rotating device is sought to be compact in size.

The material of the flywheel disks is not restricted to a magnetic material such as iron or the like, as employed in the embodiments according to the present invention, and it may be a non-magnetic material such as, for example, concrete or a synthetic resin. The shape of the flywheel disk is not restricted to a disk shape and the flywheel disk may be of a polygonal shape with many equal sides. Further, the flywheel disks may be structured such that each of all the flywheel disks is equal in weight.

Figure 24:
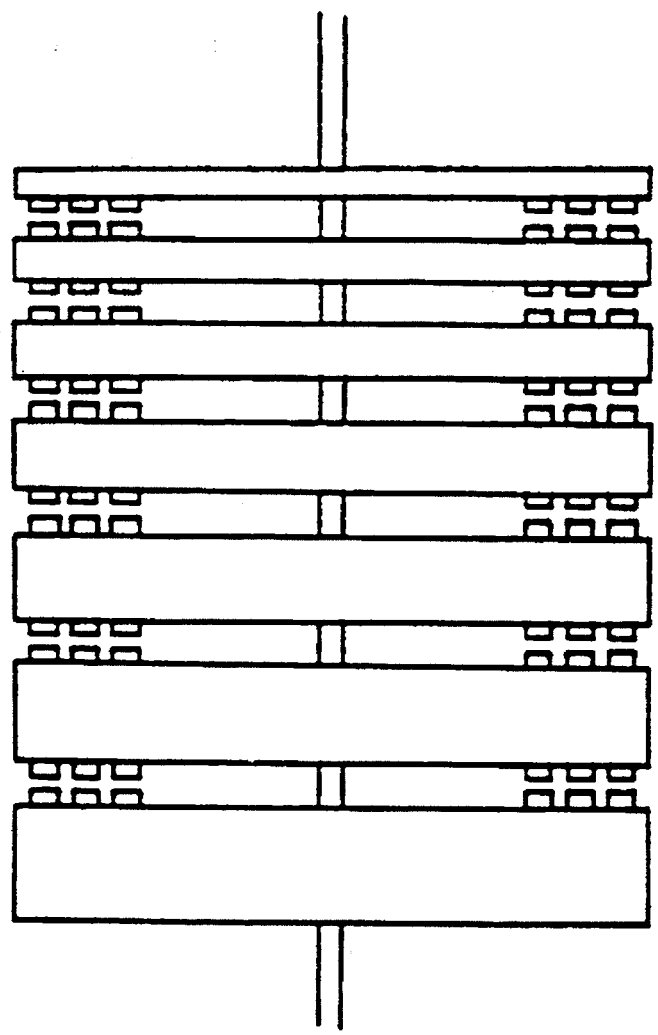
FIG. 24 is a side view showing another example of the arrangement of a poly-layered structure of flywheel disks.
Figure 25:
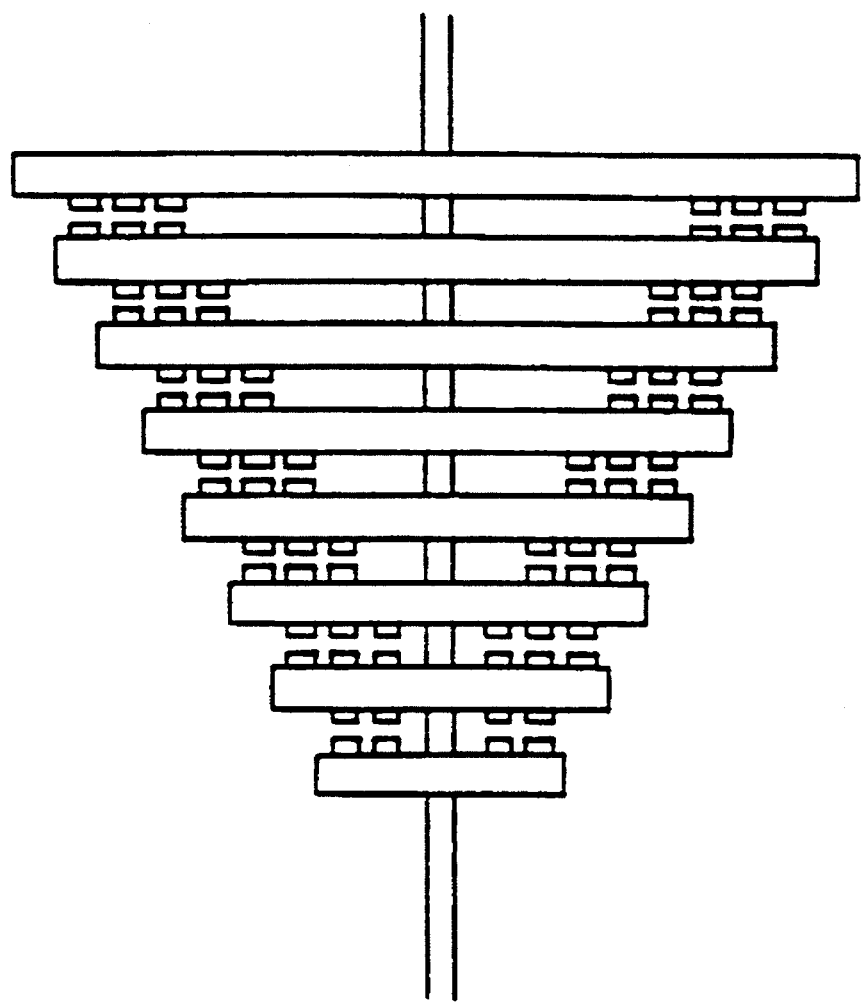
FIG. 25 is a side view showing a further example of the arrangement of a poly-layered structure of flywheel disks.
Figure 26:
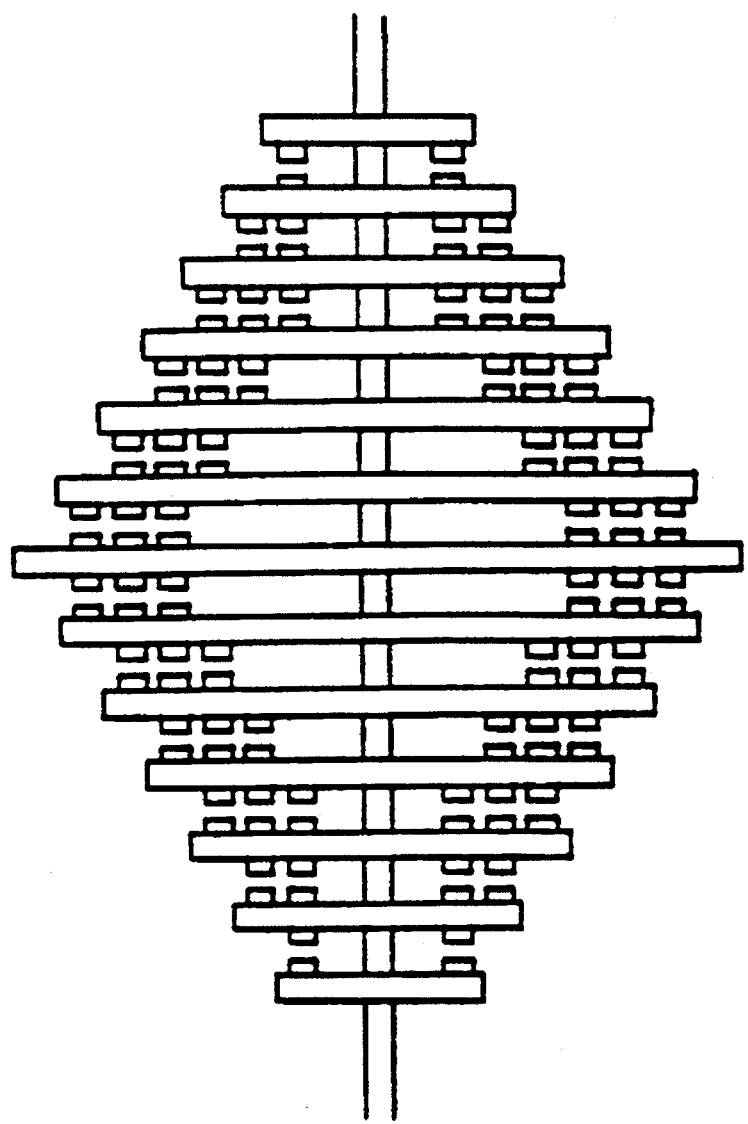
FIG. 26 is a side view showing a still further example of the arrangement of a poly-layered structure of flywheel disks.
Figure 27:
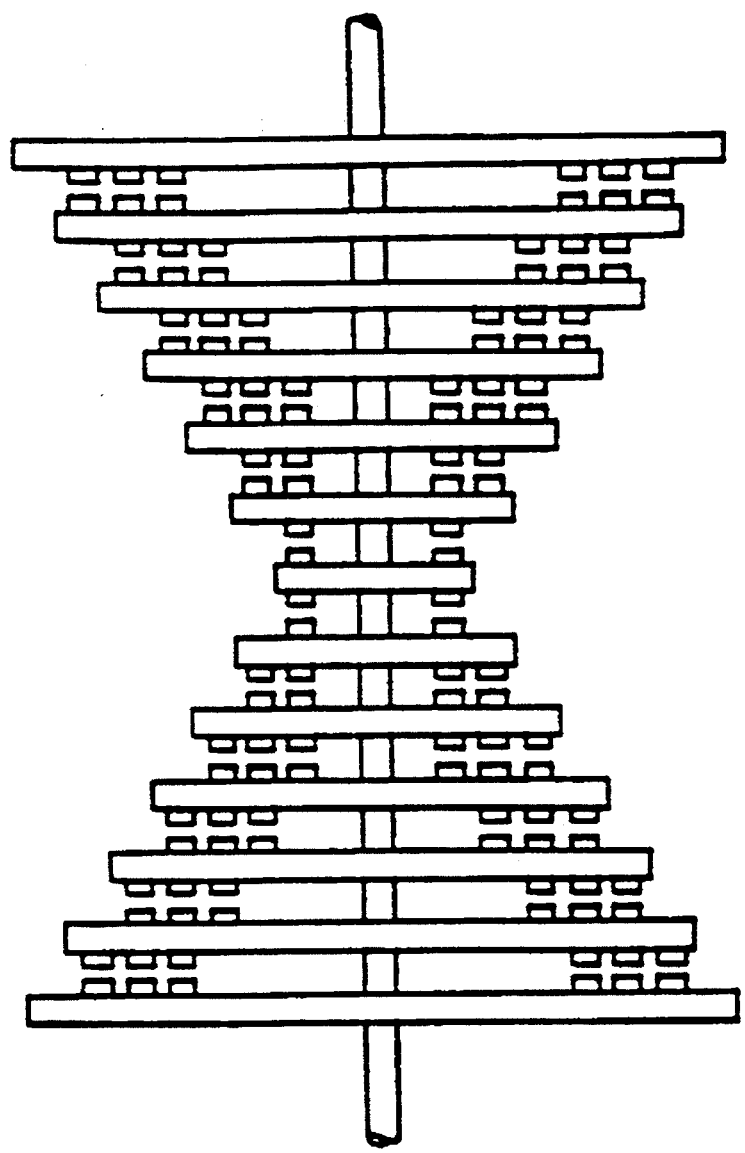
FIG. 27 is a side view showing a still further example of the arrangement of a poly-layered structure of flywheel disks.

Further, the whole shape of the flywheel disks arranged in layers is not restricted to a conical shape as in the embodiments as described hereinabove. For example, as shown in FIG. 24, it may be of a columnar form. In this arrangement of the whole flywheel disks, they may be structured in such a manner that each of the flywheel disks is sequentially thicker in disk thickness as they are placed in lower layers, and the rotative driving power is entered into the flywheel disk of the uppermost layer. Further, as shown in FIG. 25, the whole flywheel disks may be structured in an inverted cone-shaped arrangement in which the rotative driving power is entered from the flywheel disk of the lowest layer. In addition, as shown in FIG. 26, the whole flywheel disks may be arranged in a generally rectangular shape in section with both vertical sides generally rounded outwardly. In this embodiment, the rotative driving power can be entered from either of the flywheel disk of the uppermost layer or of the lowest layer. Furthermore, as shown in FIG. 27, the whole flywheel disks may be arranged in a generally rectangular shape in section with both vertical sides generally rounded inwardly. In this arrangement of the flywheel disks, the rotative driving power may be entered from the flywheel disk of the middle layer.

Furthermore, in the embodiments of the rotating devices according to the present invention, the magnetic repulsion produced between the magnets having the same polarity is employed as the means for transmitting the rotative driving power sequentially to the flywheel disks arranged in layers. In addition, the present invention is not restricted to the such means and it is also possible to utilize the magnetic attraction produced between the magnets having the opposite polarity. In other words, in this embodiment of the rotating device as described hereinabove, the permanent magnets disposed on the surface of the flywheel disk are arranged so as to be opposite in polarity to those disposed on the surface of the facing neighboring flywheel disk. Even when the permanent magnets are arranged in this manner, the rotative driving power entered into the flywheel disk of the uppermost layer is transmitted sequentially to the flywheel disks disposed in lower layers one after another.

Likewise, the spring force produced mechanically by a spring may also be employed, in place of the magnetic force produced by the magnets, as the means for transmitting the rotative driving power sequentially to the flywheel disks arranged in layers. For example, it is possible to arrange a tension spring between the flywheel disks of the neighboring layers in the positions in which the permanent magnets otherwise are disposed, in place of the permanent magnets disposed between the neighboring flywheel disks in the embodiments of the rotating devices as described hereinabove. Once the flywheel disk rotates and displaces its relative position in the circumferential direction of its rotation, the tension spring produces the spring force in the direction in which to resist the displacement of the relative positions of the flywheel disks in the circumferential direction of rotation. This spring force is transmitted from the flywheel disk of the uppermost layer one after another sequentially to the flywheel disk of the lowest layer. In addition, the spring that can be utilized for this purpose is not restricted to the tension spring and, for example, a compression spring may also be employed. When the compression spring is employed, it is disposed in such a manner that it is arranged so as for its axis to coincide with the circumferential direction of the neighboring flywheel disks and that its one end is mounted to the flywheel disk of the upper neighboring layer and its other end is mounted to the flywheel disk of the lower neighboring layer. Further, a coiled spring, a spiral spring or the like may also be mounted between the flywheel disks of the neighboring layers.

Figure 28:
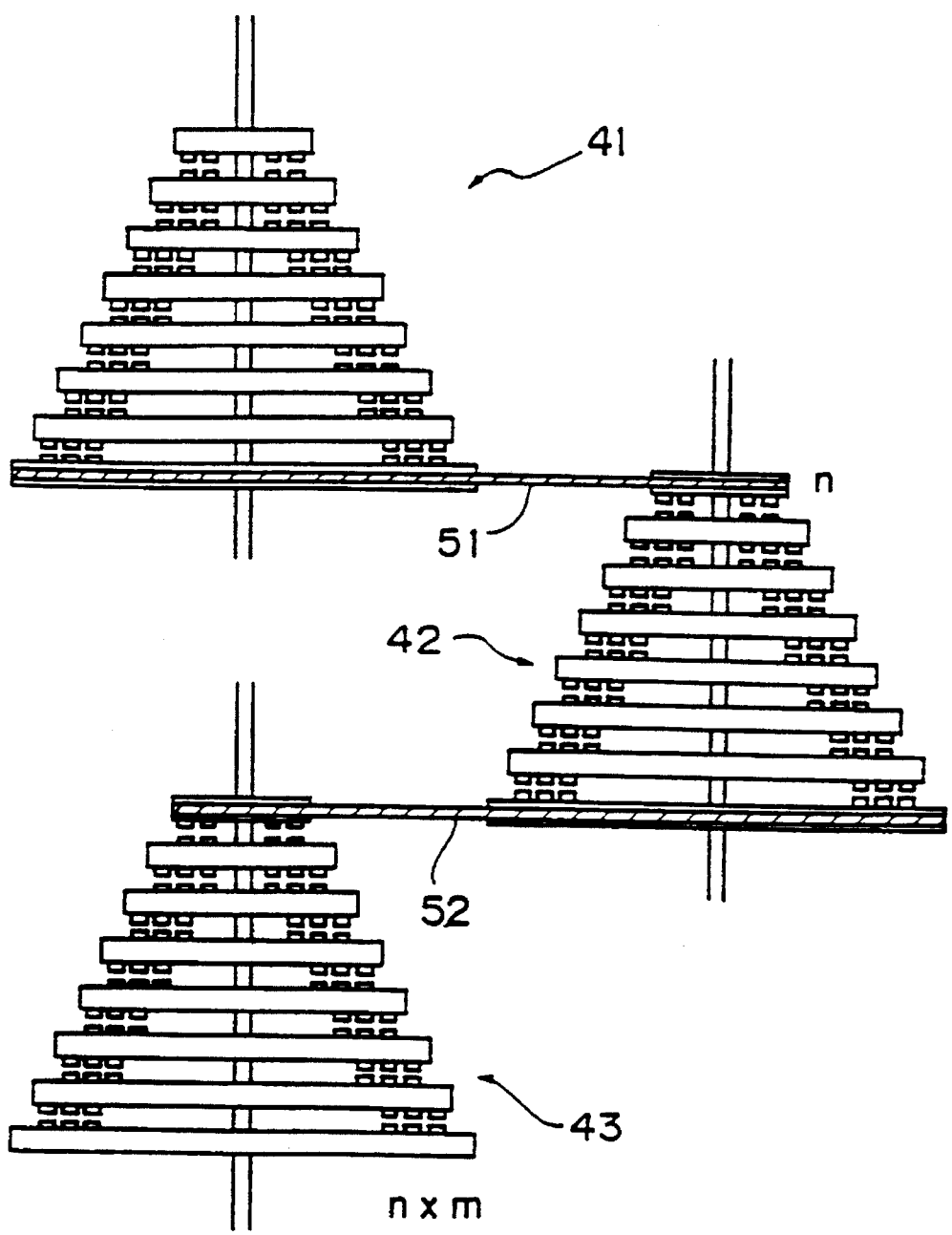
FIG. 28 is a schematic representation showing an example in which the rotating device according to the present invention is applied.

FIG. 28 shows an example in which the present invention is applied. This example indicates the flywheel rotating device that can be rotated at a very high speed, and this flywheel rotating device comprises a combination of three flywheel rotating devices 41, 42 and 43, each being of a conical shape as described hereinabove. The flywheel rotating devices 41, 42 and 43 are arranged such that the flywheel disk of the lowest layer in the flywheel rotating device 41 is connected through a belt 51 with the flywheel disk of the uppermost layer in the flywheel rotating device 42 and, further, that the flywheel disk of the lowest layer in the flywheel rotating device 42 is connected through a belt 52 with the flywheel disk of the uppermost layer in the flywheel rotating device 43. This arrangement of the flywheel rotating devices can produce a very high speed of rotation because, once the rotational number of the flywheel rotating device 41 is transmitted through the belt 51 to the flywheel rotating device 42, the rotational number is increased to an n-fold rotational number on the basis of the difference in diameter between the flywheel disks of the flywheel rotating devices 41 and 42 connected to each other through the belt 51. Likewise, once the rotational number of the flywheel rotating device 42 is transmitted through the belt 52 to the flywheel rotating device 43, the rotational number is increased to an m-fold rotational number on the basis of the difference in diameter between the flywheel disks of the flywheel rotating devices 42 and 43 connected to each other through the belt 52, eventually leading to the (n×m)-fold rotational number of the rotational number of the flywheel rotating device 41. When this arrangement is structured in a system, it can rotate the flywheel disks having a considerably heavy weight at a very high speed so that a very great magnitude of rotational energy can be provided as a whole.

As described hereinabove, the present invention can convert the sequentially entered rotative driving power efficiently into the rotational energy of the whole of the rotating body arranged in layers. When the present invention is applied to the flywheel disk rotating device, even a small-size electric motor can rotate the heavyweight flywheel disks at a high speed within a short time.

INDUSTRIAL APPLICABILITY

As described hereinabove, the rotating device according to the present invention can be utilized as a flywheel disk rotating device in a flywheel energy storage system and the like. When the flywheel disk rotating device according to the present invention is arranged so as to extract a great magnitude of rotational inertia energy accumulated in the flywheel disks instantaneously, the such rotating device can be utilized for, for example, rolling mills at iron works and cement mills at cement plants, where a great magnitude of energy is instantaneously required.

Further, the rotating device according to the present invention can first rotate a small-size flywheel disk with a small rotational force (torque) and then rotate a larger flywheel disk, thereby extracting a larger magnitude of rotational energy. In this respect, the rotating device according to the present invention can be considered as a torque converter and it can extract the output from each flywheel disk of its layered arrangement. Hence, the rotating device according to the present invention can be said to be a torque converter of a multiple-stage switch type. If it is employed for such purposes, it is preferred to make the total weight of the flywheel disks lighter in order to perform more work toward the outside.

When the rotating device according to the present invention is employed as a flywheel energy storage system, it is considered that the input energy is stored mainly as the rotational energy of the flywheel disks. In other respect, however, it is considered that the rotating device according to the present invention stores the input energy as energy of the magnetic repulsion produced between the neighboring layers of the layered rotating body. Further, the rotating device according to the present invention can be said to be a magnetic-type transmission device when it is considered that the input energy is accumulated in the form of magnetic energy and that the magnetic energy is extracted from the output side. In this case, it is preferred that, like the former embodiment of the rotating device according to the present invention, each of the rotating plates be made rather light in weight in order that the input energy is not lost as a rotational energy of the rotating plates.

I claim:

1. A device for rotating a layered body, comprising:
    a plurality of rotating plates arranged in equally spaced layers and coaxially aligned about an axis of rotation and forming pairs of neighboring plates, wherein facing plate surfaces between each said pair of neighboring plates form a gap;
    at least one group of magnetic poles on each said facing plate surface, said at least one group of magnetic poles having an opposite polarity as a corresponding group of magnetic poles on a facing plate surface of a neighboring plate;
    wherein, when said plurality of rotating plates are stationary, the magnetic poles on one plate are arranged to occupy an overlapping position with the magnetic poles on a facing plate surface of a neighboring plate.

2. A device for rotating a layered body, comprising:
    a plurality of rotating plates arranged in spaced layers and coaxially aligned about an axis of rotation and forming pairs of neighboring plates, wherein facing plate surfaces between each said pair of neighboring plates form a gap between each said pair of neighboring plates;
    at least one magnetic pole on each plate surface that forms said gap, the magnetic poles being arranged such that the polarities of magnetic poles on said facing plate surfaces in each said gap are the same, and
    wherein, when said plurality of rotating plates are stationary, the at least one magnetic pole on one plate is arranged to occupy an alternating position with a corresponding magnetic pole on said facing plate surface of a neighboring plate.

3. A device according to claim 2, wherein a plurality of magnetic poles are disposed on each plate surface of each rotating plate, the plurality of magnetic poles on each plate surface being equally spaced from one another and arranged at equal angles about the axis of rotation.

4. A device for rotating a layered body, comprising:
    a plurality of rotating plates arranged in equally spaced layers and coaxially aligned about an axis of rotation and forming pairs of neighboring plates, wherein facing plate surfaces between each said pair of neighboring plates form a gap;
    a first group of magnetic poles on each said facing plate surface, each first group of magnetic poles having a same polarity as a corresponding first group of magnetic poles on a facing plate surface of a neighboring plate;
    a second group of magnetic poles on each said facing plate surface, each second group of magnetic poles having a same polarity as a corresponding second group of magnetic poles on a facing plate surface of a neighboring plate;
    wherein, when said plurality of rotating plates are stationary, (i) each first group of magnetic poles is arranged to occupy alternating positions with a corresponding first group of magnetic poles on the facing plate surface of the neighboring plate, and (ii) each second group of magnetic poles is arranged to occupy overlapping positions with a corresponding second group of magnetic poles on the facing plate surface of the neighboring plate.

5. A device according to claim 4, wherein the magnetic poles in each first group of magnetic poles are equally spaced from one another and are separated by a first angle about the axis of rotation, and wherein the magnetic poles in each second group of magnetic poles are separated by a second angle about the axis of rotation, the second angle being about half of the first angle.

6. A device according to any one of claims 2 through 5 further comprising a rotating input layer for receiving driving power and driving means for intermittently providing a rotative driving power to the rotating input layer.

7. A device according to any one of claims 2 through 5 further comprising:

a rotating input layer for receiving driving power;

a rotating output layer for transmitting driving power; and reverse inhibiting means for inhibiting a reverse rotation of the rotating input layer, said reverse inhibiting means being mounted to at least one of (i) the rotating input layer, (ii) the rotating output layer, and (iii) each of said plurality of rotating plates.

8. A device according to claim 6 further comprising:

a rotating output layer for transmitting driving power; and reverse inhibiting means for inhibiting a reverse rotation of the rotating input layer, said reverse inhibiting means being mounted to at least one of (i) the rotating input layer, (ii) the rotating output layer, and (iii) each of said plurality of rotating plates.

9. A device according to any one of claims 2 through 5, wherein one end plate of said plurality of rotating plates comprises an input layer and another end plate of said plurality of rotating plates comprises an output layer, and wherein (i) each rotating plate comprises a disk; (ii) the rotating plate of a lower neighboring layer has a larger diameter and weighs more than a rotating plate of an upper neighboring layer; (iii) said layered body has a conical shape; and (iv) said magnetic poles provided on the rotating plate of each layer of the layered body are arranged such that a total magnetic force generated by the magnetic poles increases with each successive plate moving from the input layer towards the output layer.

10. A device according to any one of claims 2 through 5, wherein said layered body has two end plates, and wherein the magnetic poles on each rotating plate are arranged such that an axial component of magnetic repulsion, extending along the axis of rotation and acting in each gap between said facing plate surfaces for each said pair of neighboring plates, is greater than a circumferential component of magnetic repulsion extending along a direction of rotation to cause said plurality of rotating plates, other than the two end plates, to be in a suspended state.

11. A method for rotating a layered body comprising:

providing a plurality of rotating plates each having a magnetic pole disposed thereon and arranging the plurality of rotating plates in equally spaced layers that are coaxially aligned about an axis of rotation, the plurality of rotating plates forming paris of neighboring plates having facing surfaces and including an input layer;

providing driving power to the input layer of the plurality of rotating plates; and generating, between each said pair of neighboring plates, a force in a direction that resists displacement of said neighboring plates relative to each other to sequentially transmit the driving power provided to the input layer to each rotating plate in the layered body.

12. A method according to claim 11, wherein said generating comprises arranging like magnetic poles on facing surfaces of each said pair of neighboring plates to generate a repulsion force between the neighboring plates.

13. A method according to claim 11 or 12, wherein said providing comprises supplying driving power intermittently to the input layer.

* * * * *